(12) United States Patent
Yamaga et al.

(10) Patent No.: US 11,581,014 B2
(45) Date of Patent: Feb. 14, 2023

(54) MAGNETIC RECORDING MEDIUM

(71) Applicant: Sony Corporation, Tokyo (JP)

(72) Inventors: Minoru Yamaga, Tokyo (JP); Tooru Sato, Tokyo (JP); Kanako Hashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/259,072

(22) PCT Filed: Oct. 8, 2020

(86) PCT No.: PCT/JP2020/038124
§ 371 (c)(1),
(2) Date: Jan. 8, 2021

(87) PCT Pub. No.: WO2021/070907
PCT Pub. Date: Apr. 15, 2021

(65) Prior Publication Data
US 2022/0270643 A1 Aug. 25, 2022

(30) Foreign Application Priority Data
Oct. 10, 2019 (JP) .............................. JP2019-186904

(51) Int. Cl.
*G11B 5/70* (2006.01)
*G11B 5/706* (2006.01)
*G11B 5/008* (2006.01)
*G11B 5/78* (2006.01)

(52) U.S. Cl.
CPC .......... *G11B 5/70678* (2013.01); *G11B 5/008* (2013.01); *G11B 5/78* (2013.01)

(58) Field of Classification Search
None
See application file for complete search history.

(56) References Cited

FOREIGN PATENT DOCUMENTS

| EP | 1515348 A2 * | 3/2005 | ............ B22F 1/0022 |
|----|----|----|----|
| JP | 10-241143 | 9/1998 | |
| JP | H10241143 A | 9/1998 | |
| JP | H11-039636 A | 2/1999 | |
| JP | 11-126320 | 5/1999 | |
| JP | H11126320 A | 5/1999 | |
| JP | 2000-163730 | 6/2000 | |

(Continued)

OTHER PUBLICATIONS

Japanese Decision to Grant dated Nov. 17, 2020 in corresponding Japanese Application No. 2020-556817.

*Primary Examiner* — William J Klimowicz
(74) *Attorney, Agent, or Firm* — K&L Gates LLP

(57) ABSTRACT

The present technology provides a tape-shaped magnetic recording medium including a magnetic layer, an underlayer, a base layer, and a back layer. The magnetic recording medium has an average thickness $t_T$ of 5.4 μm or less, when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which a length in a longitudinal direction is shorter than the length at 40° C., and a Poisson's ratio is 0.40 or less.

22 Claims, 9 Drawing Sheets

(56) References Cited

FOREIGN PATENT DOCUMENTS

| | | | | |
|---|---|---|---|---|
| JP | 2000163730 | A | 6/2000 | |
| JP | 2002011786 | A * | 1/2002 | ............... G11B 5/73 |
| JP | 2004213775 | A * | 7/2004 | ............... G11B 5/70 |
| JP | 2005310219 | A * | 11/2005 | ............... G11B 5/71 |
| JP | 2006-099919 | | 4/2006 | |
| JP | 2007250078 | A * | 9/2007 | |
| JP | 4590693 | B2 * | 12/2010 | ............ B22F 1/0022 |
| KR | 20020076301 | A * | 10/2002 | ............. B29C 55/12 |
| WO | WO-2005046968 | A1 * | 5/2005 | ............... G11B 5/73 |
| WO | 2019/1716665 | | 9/2019 | |

* cited by examiner

MAGNETIC RECORDING MEDIUM

TECHNICAL FIELD

The present technology relates to a magnetic recording medium.

BACKGROUND ART

For example, with the development of IoT, big data, and artificial intelligence, the amount of data collected and stored has increased significantly. A magnetic recording medium is often used as a medium for recording a large amount of data.

With respect to a magnetic recording medium, various technologies have been proposed so far. For example, the following Patent Literature 1 discloses a magnetic recording medium including a substrate of the magnetic recording medium, a magnetic layer provided on a surface of the substrate for recording information, a protective film for protecting the magnetic layer, a lubricating layer formed on the protective film, and a back-coat layer provided on a back surface of the substrate, in which a reversal temperature (Ti) exceeds 100° C.

CITATION LIST

Patent Literature

Patent Literature 1: Japanese Patent Application Laid-open No. Hei 11-39636

DISCLOSURE OF INVENTION

Technical Problem

The magnetic recording medium is accommodated in, for example, a magnetic recording cartridge. In order to further increase the recording capacity per magnetic recording cartridge, it is conceivable that the magnetic recording medium (for example, a magnetic recording tape) accommodated in the magnetic recording cartridge is made thinner (the total thickness is reduced) to increase the tape length per magnetic recording cartridge.

However, as the total thickness of the magnetic recording medium becomes thinner, recording or reproduction may not be satisfactorily performed after long-term storage of the magnetic recording medium. In this regard, it is an object of the present technology to provide a magnetic recording medium capable of being satisfactorily reproduced or recorded even after long-term storage, even if the total thickness is small.

Solution to Problem

The present technology provides a tape-shaped magnetic recording medium including: a magnetic layer; an underlayer; a base layer; and a back layer, in which the magnetic recording medium has an average thickness $t_T$ of 5.4 μm or less, when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which a length in a longitudinal direction is shorter than the length at 40° C., and a Poisson's ratio is 0.40 or less.

The average thickness $t_T$ of the magnetic recording medium may be 5.3 μm or less.

In one embodiment of the present technology, the Poisson's ratio may be 0.38 or less.

The base layer may contain any of PET and PEN.

The base layer may have a thickness of 4.2 μm or less.

The base layer may have a thickness of 4.0 μm or less.

The magnetic recording medium may have a squareness ratio of 65% or more in a perpendicular direction.

The magnetic recording medium may have a contraction ratio of −0.035% or more in a width direction.

The magnetic layer may have an average thickness $t_m$ of 80 nm or less.

The magnetic layer may have an average thickness $t_m$ of 50 nm or less.

The magnetic layer may contain a magnetic powder, and the magnetic powder may contain hexagonal ferrite, ε-iron oxide, or Co-containing spinel ferrite.

The hexagonal ferrite may contain at least one of Ba or Sr, and the ε-iron oxide may contain at least one of Al or Ga.

The magnetic recording medium may have a coercive force Hc of 2,000 Oe or less in the longitudinal direction.

The magnetic layer may be configured to be capable of recording data such that a minimum value of a magnetization reversal distance L is 48 nm or less.

The magnetic layer may contain a magnetic powder, and the magnetic powder may have an average aspect ratio of 1.0 or more and 3.5 or less.

The magnetic layer may contain a magnetic powder, and the magnetic powder may have an average particle size of 50 nm or less.

The magnetic layer may contain a magnetic powder, and the magnetic powder may have an average particle volume of 1,500 nm³ or less.

The magnetic layer may contain a magnetic powder, and the magnetic powder may have an average particle volume of 1,300 nm³ or less.

Further, the present technology also provides a tape cartridge including the magnetic recording medium described above.

The tape cartridge may include: a communication unit that communicates with a recording/reproduction apparatus; a storage unit; and a control unit that stores, in the storage unit, information received from the recording/reproduction apparatus via the communication unit, and reads the information from the storage unit and transmits the read information to the recording/reproduction apparatus via the communication unit in response to a request from the recording/reproduction apparatus, the information including adjustment information for adjusting tension applied to the magnetic recording medium in a longitudinal direction.

Furthermore, the present technology also provides a method of producing a tape-shaped magnetic recording medium, including: a laminate forming step of forming a laminate by forming an underlayer and a magnetic layer on one surface of a base layer and forming a back layer on another surface of the base layer; and a thermal history relaxation treatment step of storing the laminate obtained in the laminate forming step for 10 hours or more and 100 hours or less under a condition of 50° C. or more and 80° C. or less, in which the magnetic recording medium is produced through the thermal history relaxation treatment step, the magnetic recording medium has an average thickness $t_T$ of 5.4 μm or less, when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which a length in a longitudinal direction is shorter than the length at 40° C., and a Poisson's ratio is 0.40 or less.

The thermal history relaxation treatment step may include a low tension heat treatment step of causing the laminate to travel for 15 seconds or more and 240 seconds or less under a condition of 80° C. or more and 150° C. or less while a tension of 0.1 N or less per ½ inch length in a width direction is applied to the laminate in the longitudinal direction.

MODE(S) FOR CARRYING OUT THE INVENTION

Figure 1:
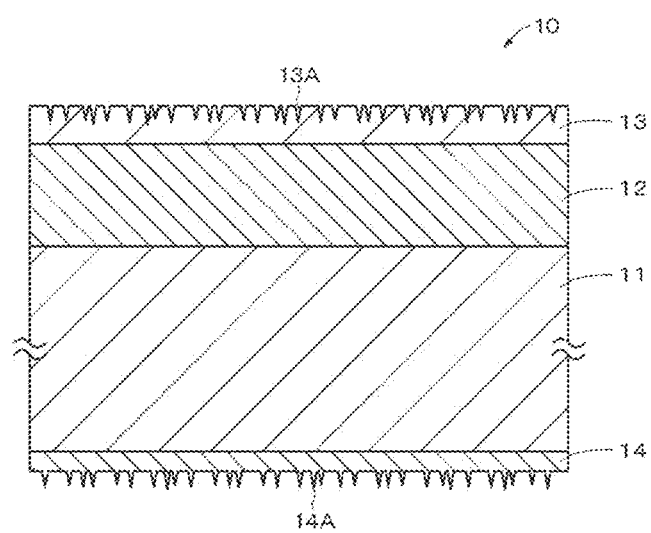
FIG. 1 is a schematic view of a cross section of an example of a magnetic recording medium according to the present technology.

Hereinafter, a favorable embodiment for carrying out the present technology will be described. Note that the embodiment to be described below shows a typical embodiment of the present technology, and the scope of the present technology is not limited to only these embodiments.

The present technology will be described in the following order.
1. Description of present technology
2. Embodiment of present technology (example of coating-type magnetic recording medium)
(1) Configuration of magnetic recording medium
(2) Description of each layer
(3) Physical properties and structure
(4) Method of producing magnetic recording medium
(5) Recording/reproduction apparatus
(6) Cartridge
(7) Modified example of cartridge
(8) Effects
(9) Modified examples
3. Examples 1. Description of Present Technology The present inventors have investigated various magnetic recording media having a small total thickness. As a result, the present inventors have found that a magnetic recording medium having a specific configuration can be satisfactorily reproduced or recorded even after long-term storage. That is, a magnetic recording medium according to the present technology includes a magnetic layer, an underlayer, a base layer, and a back layer, in which an average thickness $t_T$ of the magnetic recording medium is 5.4 µm or less; when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which the length in the longitudinal direction is shorter than the length at 40° C.; and a Poisson's ratio is 0.40 or less.

In the recording or reproduction of the magnetic recording medium after the magnetic recording medium has been stored for a long period of time, the recording or reproduction may take more time than usual or may be impossible because the data signal cannot be written or read. Such a phenomenon tends to appear as the total thickness of the magnetic recording medium is made thinner in order to write high-capacity data to the magnetic recording medium or as the width of the data track on which recording and reproduction are performed is made narrower. In particular, this phenomenon tends to appear particularly for systems in which the data tracks are arranged parallel to the longitudinal direction of the tape. Regarding the factors that cause such a phenomenon as the total thickness becomes thinner, it is considered to be an important factor that the deformation of the magnetic recording medium (especially, deformation in the width direction) tends to occur as the total thickness of the magnetic recording medium becomes thinner, and that the track width becomes narrower for the purpose of increasing the capacity.

The deformation of the magnetic recording medium may occur, for example, when the strain generated in the magnetic recording medium is alleviated. The strain is particularly likely to occur when heat is applied to the magnetic recording medium, and the strain due to heat is more likely to occur when the total thickness of the magnetic recording medium becomes thinner. Examples of the case where heat is applied to the magnetic recording medium include a calendering step and a drying step in the process of producing the magnetic recording medium.

The magnetic recording medium according to the present technology having the above-mentioned configuration can be satisfactorily reproduced or recorded even after long-term storage, although the total thickness is small. This is because the above-described configuration can suppress the alleviation of the strain during the long-term storage.

In the magnetic recording medium according to the present technology, when a thermomechanical analysis is performed in a temperature range of 40° C. to 150° C. at a temperature rise rate of 1° C./minute, a switching temperature for switching from thermal expansion to thermal contraction is 70° C. or more, favorably 75° C. or more, and more favorably 80° C. or more, and a contraction start temperature is 90° C. or more at which the length in the longitudinal direction is shorter than the length at 40° C., favorably 95° C. or more, and more favorably 100° C. or more. When the switching temperature and the contraction start temperature are within the above-mentioned numerical range, the reproduction or recording can be performed satisfactorily even after long-term storage.

Further, the switching temperature can be adjusted by changing various factors including, for example, physical properties of the base layer (e.g., glass transition temperature or the like). Note that the switching temperature may be, for example, 120° C. or less, 110° C. or less, or 100° C. or less.

The contraction start temperature can also be adjusted by changing various factors including, for example, physical properties of the base layer (e.g., glass transition temperature or the like). Note that the contraction start temperature may be, for example, 130° C. or less, 120° C. or less, or 110° C. or less.

The upper limit values of the switching temperature and the contraction start temperature may be determined by the glass transition temperature of the base layer material. The lower limit values of the switching temperature and the contraction start temperature may be determined by the materials of the layers other than the base layer and the thermal history in the production process.

The method of measuring the switching temperature and the contraction start temperature will be described in the section 2. below.

The Poisson's ratio of the magnetic recording medium according to the present technology is 0.40 or less, favorably 0.38 or less, and more favorably 0.36 or less. When the Poisson's ratio is within such a numerical range, it is possible to suppress the deformation of the magnetic recording medium in the width direction after long-term storage.

Further, the Poisson's ratio of the magnetic recording medium according to the present technology may be, for example, 0.20 or more, favorably 0.23 or more, more favorably 0.26 or more, and still more favorably 0.30 or more. If the Poisson's ratio is too low, the tape width cannot be changed by controlling the tension applied in the longitudinal direction of the tape.

An average thickness $t_T$ of the magnetic recording medium according to the present technology is 5.4 μm or less, more favorably 5.3 μm or less, and still more favorably 5.2 μm or less, 5.0 μm or less, or 4.6 μm or less. Since the magnetic recording medium according to the present technology is thin, for example, the length of the tape to be wound in one magnetic recording cartridge can be made longer, thereby increasing the recording capacity per magnetic recording cartridge.

The width of the magnetic recording medium according to the present technology may be, for example, from 5 mm to 30 mm, particularly from 7 mm to 25 mm, more particularly from 10 mm to 20 mm, and still more particularly from 11 mm to 19 mm. The length of the tape magnetic recording medium according to the present technology may be, for example, from 500 m to 1500 m. For example, the width of the tape according to the LTO8 standard is 12.65 mm and the length of the tape is 960 m.

The magnetic recording medium according to the present technology has a tape shape and can be, for example, an elongated magnetic recording tape. The tape-shaped magnetic recording medium according to the present technology may be housed in, for example, a magnetic recording cartridge. More specifically, it may be housed in the cartridge while being wound on a reel in the magnetic recording cartridge.

The magnetic recording medium according to the present technology includes a magnetic layer, an underlayer, a base layer, and a back layer. These four layers may be stacked in this order. The magnetic recording medium according to the present technology may include other layers in addition to these layers. The other layers may be appropriately selected in accordance with the type of the magnetic recording medium. The magnetic recording medium according to the present technology may be, for example, a coating-type magnetic recording medium. The coating-type magnetic recording medium will be described in more detail in the section 2. below.

2. Embodiment (Example of Coating-Type Magnetic Recording Medium)

(1) Configuration of Magnetic Recording Medium

First, a configuration of a magnetic recording medium 10 according to a first embodiment will be described with reference to FIG. 1. The magnetic recording medium 10 is, for example, a magnetic recording medium subjected to perpendicular orientation treatment, and as shown in FIG. 1, includes an elongated base layer (also referred to as a base) 11, an underlayer 12 (non-magnetic layer) 12 provided on one main surface of the base layer 11, a magnetic layer (also referred to as a recording layer) 13 provided on the underlayer 12, and a back layer 14 provided on the other main surface of the base layer 11. In this specification, of both the main surfaces of the magnetic recording medium 10, the surface of the side on which the magnetic layer 13 is provided is also referred to as a magnetic surface or a surface of the magnetic layer side, and the surface opposite to the magnetic surface (the surface of the side on which the back layer 14 is provided) is also referred to as a back surface.

The magnetic recording medium 10 has a tape-like shape, and is caused to travel in a longitudinal direction during recording and reproduction. Further, the magnetic recording medium 10 may be configured to be capable of recording a signal at a shortest recording wavelength of favorably 100 nm or less, more favorably 75 nm or less, still more favorably 60 nm or less, and particularly favorably 50 nm or less, and may be used in a recording/reproduction apparatus in which, for example, the shortest recording wavelength is within the above range. The recording/reproduction apparatus may include a ring-type head as a recording head.

(2) Description of Each Layer (Base Layer)

The base layer 11 can function as a support of the magnetic recording medium 10, and can be, for example, an elongated non-magnetic base having flexibility, particularly, a non-magnetic film. The thickness of the base layer 11 is, for example, 4.8 μm or less, favorably 4.6 μm or less, more favorably 4.4 μm or less, still more favorably 4.2 μm or less, 4.0 μm or less, or 3.8 μm or less. The thickness of the base layer 11 may be, for example, 2.0 μm or more, favorably 2.2 μm or more, more favorably 2.4 μm or more, and still more favorably 2.6 μm or more.

The average thickness of the base layer 11 is obtained as follows. First, the magnetic recording medium 10 having a ½ inch width is prepared and cut into a length of 250 mm to prepare a sample. Subsequently, layers other than the base layer 11 of the sample (i.e., the underlayer 12, the magnetic layer 13, and the back layer 14) are removed with a solvent of MEK (methyl ethyl ketone), dilute hydrochloric acid, or the like. Next, using a laser hologage (LGH-110C) manufactured by Mitutoyo Corporation as a measuring device, the thickness of the sample (the base layer 11) is measured at five or more points, and the measured values are simply averaged (arithmetically averaged) to calculate the average thickness of the base layer 11. Note that the measurement positions are randomly selected from the sample.

The base layer 11 contains, for example, a polyester as a main component. The polyester may be, for example, one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), and polyethylene bisphenoxycarboxylate, or a mixture of two or more of them. In this specification, the "main component" means that the component is the component having the highest content ratio among the components forming the base layer. For example, the main component of the base layer 11 being polyester may mean that the content ratio of the polyester in the base layer 11 is, for example, 50% by mass or more, 60% by mass or more, 70% by mass or more, 80% by mass or more, 90% by mass or more, 95% by mass or more, or 98% by mass or more on the basis of the mass of the base layer 11, or that the base layer 11 is formed of only polyester.

In this embodiment, the base layer 11 may contain, in addition to the polyester, a resin described below other than the polyester.

In accordance with a favorable embodiment of the present technology, the base layer 11 may be formed of PET or PEN.

In other embodiments of the present technology, the base layer 11 may be formed of a resin other than polyester. The resin for forming the base layer 11 may include at least one of, for example, polyolefin-based resins, cellulose derivatives, vinyl-based resins, or different polymer resins. In the case where the base layer 11 contains two or more of these resins, the two or more materials may be mixed, copolymerized, or stacked.

The polyolefin-based resins include, for example, at least one of PE (polyethylene) or PP (polypropylene). The cellulose derivatives include, for example, at least one of cellulose diacetate, cellulose triacetate, CAB (cellulose acetate butyrate), or CAP (cellulose acetate propionate). The vinyl-based resins include, for example, at least one of PVC (polyvinyl chloride) or PVDC (polyvinylidene chloride).

The different polymer resins include, for example, at least one of PEEK (polyether ether ketone), PA (polyamide, nylon), aromatic PA (aromatic polyamide, aramid), PI (polyimide), aromatic PI (aromatic polyimide), PAI (polyamide-imide), aromatic PAI (aromatic polyamideimide), PBO (polybenzoxazole, e.g., Zylon (registered trademark)), polyether, PEK (polyetherketone), polyether ester, PES (polyethersulfone), PEI (polyether imide), PSF (polysulfone), PPS (polyphenylene sulfide), PC (polycarbonate), PAR (polyarylate), or PU (polyurethane).

(Magnetic Layer)

The magnetic layer 13 may be, for example, a perpendicular recording layer. The magnetic layer 13 may contain a magnetic powder and a lubricant. The magnetic layer 13 may contain, for example, a binder in addition to the magnetic powder and the lubricant, and may further contain, particularly, a binder and conductive particles. The magnetic layer 13 may further contain, as necessary, an additive such as an abrasive and a rust inhibitor, for example.

The magnetic layer 13 includes pores. That is, the magnetic layer 13 has a surface in which a large number of pores are provided. Favorably, in the magnetic layer 13, pores are provided in a region in contact with a magnetic head in recording and/or reproduction of the magnetic recording medium 10, and particularly favorably, pores may be provided over the entire region.

The pores may open perpendicularly to the surface of the magnetic layer 13. The pores can be formed, for example, by pressing a large number of protrusions provided on the surface of the back layer side of the magnetic recording medium 10. In this case, the pores may correspond to the protrusions.

Note that FIG. 1 shows the pores indicated by reference numeral 13A, but FIG. 1 is a schematic diagram for better understanding of the present technology, and the shape of the pores 13A shown in FIG. 1 does not necessarily represent the actual shape.

The average thickness $t_m$ of the magnetic layer 13 is favorably 35 nm$\leq t_m \leq$120 nm, more favorably 35 nm$\leq t_m \leq$100 nm, particularly favorably 35 nm$\leq t_m \leq$90 nm, still more favorably 35 nm$\leq t_m \leq$80 nm, and particularly favorably 35 nm$\leq t_m \leq$50 nm. The average thickness $t_m$ of the magnetic layer 13 is within the above numerical range, which contributes to improving the electromagnetic conversion characteristics.

Particularly favorably, the average thickness $t_m$ of the magnetic layer may be 80 nm or less, and still more favorably 50 nm or less. Having an average thickness within this numerical range contributes to improving the recording/reproducing characteristics of the magnetic recording medium 10.

The average thickness $t_m$ of the magnetic layer 13 is obtained, for example, as follows.

The magnetic recording medium 10 is processed by the FIB (Focused Ion Beam) method or the like to obtain a slice. In the case of using the FIB method, a carbon film and a tungsten thin film are formed as a protective film in pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

The cross-section of the obtained sliced samples is observed by a transmission electron microscope (TEM) under the following condition to obtain a TEM image. Note that depending on the type of the device, the magnification and acceleration voltage may be adjusted as appropriate.

Device: TEM (H9000NAR manufactured by Hitachi, Ltd.)
Acceleration voltage: 300 kV
Magnification: 100,000 times Next, the obtained TEM image is used to measure the thickness of the magnetic layer 13 at least 10 positions in the longitudinal direction of the magnetic recording medium 10. The obtained measured values are simply averaged (arithmetically averaged) and the obtained average value is taken as an average thickness $t_m$ [nm] of the magnetic layer 13. Note that the positions at which the measurement is performed are randomly selected from the test piece.

The magnetic layer 13 is favorably a perpendicularly oriented magnetic layer. In this specification, the term "perpendicular orientation" means that a squareness ratio S1 measured in the longitudinal direction (traveling direction) of the magnetic recording medium 10 is 35% or less. The method of measuring the squareness ratio S1 will be described below separately.

Note that the magnetic layer 13 may be a magnetic layer having an in-plane orientation (longitudinal orientation). That is, the magnetic recording medium 10 may be a longitudinal-recording-type magnetic recording medium. However, in terms of high recording density, the perpendicular orientation is more favorable.

(Servo Pattern)

Figure 2:
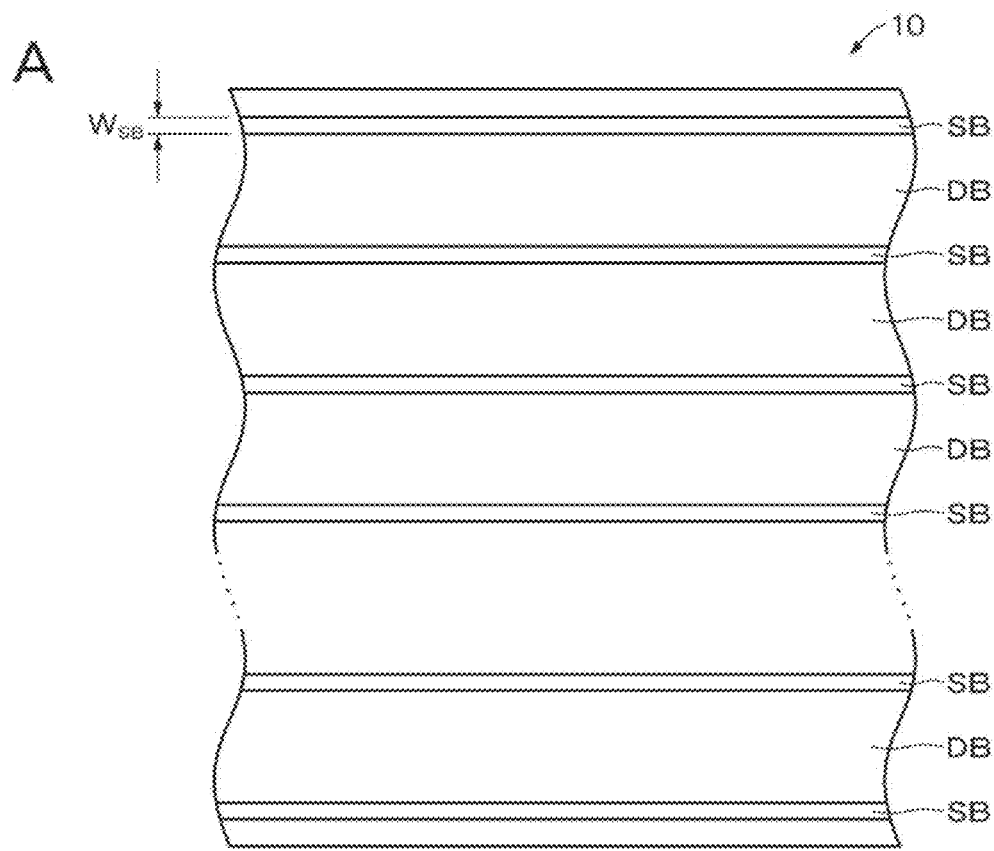
FIG. 2 is a diagram showing an example of a data band and a servo band provided in the magnetic recording medium.
Figure 2:
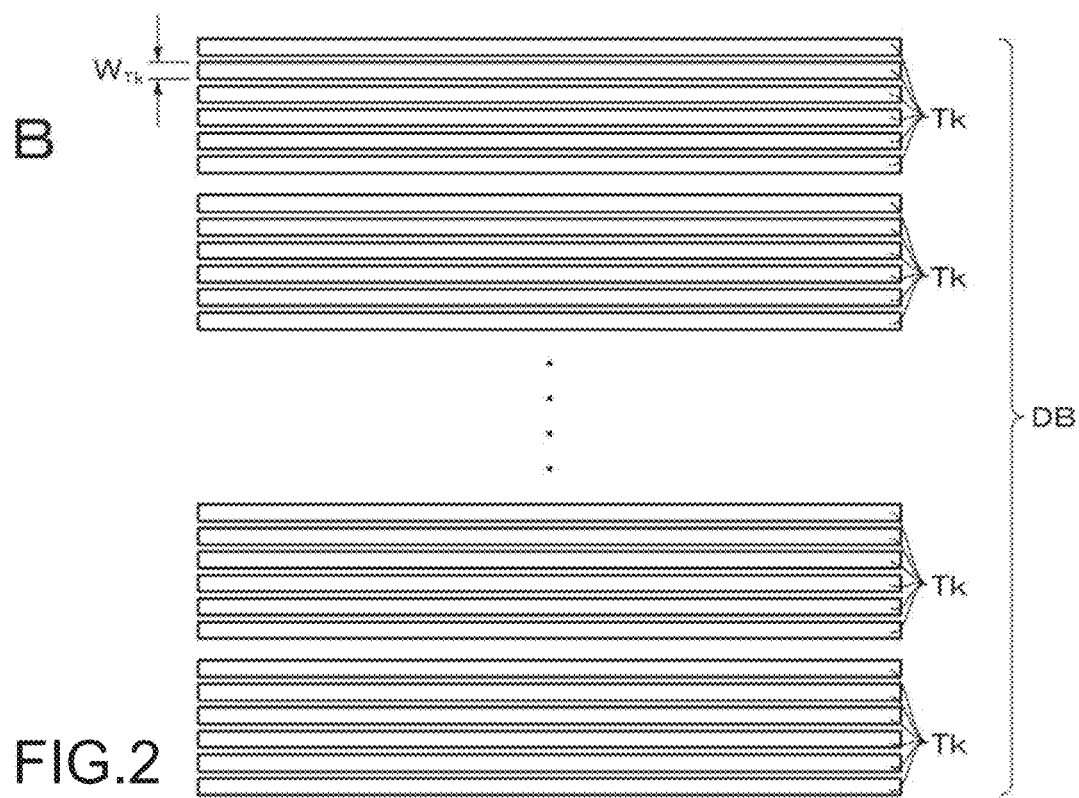

The magnetic layer 13 includes a recorded servo pattern. For example, as shown in FIG. 2A, the magnetic layer may include a plurality of servo bands SB and a plurality of data bands DB. The plurality of servo bands SB is provided at equal intervals in the width direction of the magnetic recording medium 10. The data band DB is provided between adjacent servo bands SB. A servo signal for controlling the tracking of the magnetic head may be written in the servo band SB in advance. User data may be recorded in the data band DB.

The magnetic layer 13 may include, for example, at least one data band and at least two servo bands. The number of data bands may be, for example, 2 to 10, particularly 3 to 6, and more particularly 4 or 5. The number of servo bands may be, for example, 3 to 11, particularly 4 to 7, and more particularly 5 or 6. These servo bands and data bands may be disposed so as to extend, for example, in the longitudinal direction of the tape-shaped magnetic recording medium (particularly elongated magnetic recording tape), particularly so as to be substantially parallel thereto. Examples of the magnetic recording medium including the data bands and the servo bands include a magnetic recording tape according to the Linear Tape-Open (LTO) standard.

That is, the magnetic recording medium according to the present technology may be a magnetic recording tape according to the LTO standard. For example, the magnetic recording medium according to the present technology may be a magnetic recording tape according to the LTO8 or subsequent standards.

From the viewpoint of ensuring high recording capacity, a ratio $R_S$ (=$S_{SB}$/S) 100) of a total area $S_{SB}$ of the servo bands SB to an area S of the entire surface of the magnetic layer 13 is favorably 4.0% or less, more favorably 3.0% or less, and still more favorably 2.0% or less.

Note that the servo band width $W_{SB}$ of the servo band SB is favorably 95 μm or less, more favorably 60 μm or less, and still more favorably 30 μm or less from the viewpoint of ensuring high recording capacity. The servo band width $W_{SB}$ is favorably 10 μm or more from the viewpoint of the production of a recording head.

The magnetic layer 13 may include, for example, five or more servo bands. In order to ensure five or more servo tracks, the ratio $R_S$ of the total area $S_{SB}$ of the servo bands SB to the area S of the surface of the magnetic layer 13 may favorably be 0.8% or more.

The ratio $R_S$ of the total area $S_{SB}$ of the servo bands SB to the area S of the entire surface of the magnetic layer 13 is obtained as follows. For example, the magnetic recording medium 10 is developed using a ferricolloid developer (SigMarker Q manufactured by Sigma Hi Chemical Inc.), and the developed magnetic recording medium 10 is then observed with an optical microscope to measure a servo band width $W_{SB}$ and the number of servo bands SB. Next, the ratio $R_S$ is obtained from the following formula.

Ratio $R_S$ [%]=(((servo band width $W_{SB}$)×(number of servo bands))/(width of magnetic recording medium 10))×100

(Recording Track)

As shown in FIG. 2B, the magnetic layer 13 is configured to be capable of forming a plurality of recording tracks (also referred to as data tracks) Tk in the data band DB.

From the viewpoint of ensuring high recording capacity, a recording track width Wm may be, for example, 2.50 μm or less, favorably 2.20 μm or less, more favorably 2.00 μm or less, and still more favorably 1.80 μm or less.

The recording track width $W_{Tk}$ may be, for example, 0.02 μm or more, favorably 0.40 μm or more, more favorably 0.50 μm or more, and still more favorably 0.60 μm or more from the viewpoint of the magnetic particle size.

As described above, the magnetic layer 13 may be configured to be capable of forming a plurality of recording tracks Tk in the data band DB. That is, the magnetic recording medium 10 may include no recording tracks. In this case, the magnetic recording medium 10 may be used, for example, to form a recording track having a recording track width within the above numerical range, or may be used in a magnetic recording apparatus that forms a recording track having a recording track width within the above numerical range.

Alternatively, the magnetic recording medium 10 may include recording tracks. The recording tracks may have a recording track width within the above numerical range.

The fact that the recording track width is within the above numerical range contributes to good recording or reproduction even after long-term storage of a thin magnetic recording medium. Further, the fact that the recording track width is within the above numerical range also contributes to improving the SNR of a thin magnetic recording medium.

The recording track width $W_{Tk}$ is obtained as follows. For example, data recording patterns of data band portions of the magnetic layer 13 in which data is recorded on the entire surface are observed using a magnetic force microscope (MFM) to obtain an MFM image. Dimension 3100 manufactured by Digital Instruments and the analysis software thereof are used as the MFM. The measurement region of the MFM image is 10 μm×10 μm, and the measurement region of 10 μm×10 μm is divided into 512×512 (=262,144) measurement points. The measurement by the MFM is performed on three 10 μm×10 μm measurement regions at different locations, i.e., three MFM images are obtained. From the three MFM images obtained, the track widths are measured at 10 locations using the analysis software attached to Dimension 3100, and the average value thereof (which is a simple average) is obtained. The obtained average value is the recording track width Wm. Note that the measurement conditions of the MFM are as follows: sweep rate: 1 Hz, chip used: MFMR-20, lift height: 20 nm, and correction: Flatten order 3.

From the viewpoint of ensuring high recording capacity, the magnetic layer 13 is configured to be capable of recording data such that the minimum value of a magnetization reversal distance L is favorably 48 nm or less, more favorably 44 nm or less, and still more favorably 40 nm or less. The minimum value of the magnetization reversal distance L is taken into account by the magnetic particle size. The minimum value of the magnetization reversal distance L is obtained as follows. For example, data recording patterns of data band portions of the magnetic layer 13 in which data is recorded on the entire surface are observed using a magnetic force microscope (MFM) to obtain an MFM image. Dimension 3100 manufactured by Digital Instruments and the analysis software thereof are used as the MFM. The measurement region of the MFM image is 2 μm×2 μm, and the measurement region of 2 μm×2 μm is divided into 512×512 (=262,144) measurement points. The measurement by the MFM is performed on three 2 μm×2 μm measurement regions at different locations, i.e., three MFM images are obtained. Fifty bit-to-bit distances are measured from the two-dimensional uneven chart of the recording pattern of the obtained MFM image. The bit-to-bit distances are measured using the analysis software attached to Dimension 3100. The value that becomes approximately the greatest common divisor of the measured 50 bit-to-bit distances is defined as the minimum value of the magnetization reversal distance L. Note that the measurement conditions are as follows: sweep rate: 1 Hz, chip used: MFMR-20, lift height: 20 nm, and correction: Flatten order 3.

The magnetic recording medium 10 is favorably reproduced by using a reproduction head having a reproduction track width equal to or less than the recording track width.

The ratio of (reproduction track width/recording track width) of the magnetic recording medium 10 may be favorably 1.00 or less, more favorably 0.90 or less, still more favorably 0.85 or less, 0.83 or less, or 0.80 or less.

The ratio of (reproduction track width/recording track width) of the magnetic recording medium 10 may be favorably 0.50 or more, more favorably 0.52 or more, and still more favorably 0.54 or more, 0.56 or more, 0.58 or more, or 0.60 or more.

The ratio of (reproduction track width/recording track width) of the magnetic recording medium 10 may be, for example, 0.50 or more and 1.00 or less, favorably 0.52 or more and 0.90 or less, more favorably 0.56 or more and 0.85 or less, and still more favorably 0.60 or more and 0.85 or less.

The fact that the ratio of (reproduction track width/recording track width) falls within the above numerical range contributes to good reproduction even after long-term storage of a thin magnetic recording medium. Further, the fact that the ratio of (reproduction track width/recording track width) falls within the above-mentioned numerical range also contributes to improving the SNR of a thin magnetic recording medium.

The magnetic recording medium 10 is suitable for use in a recording/reproduction apparatus including a reproduction head in which the ratio falls within the above-mentioned numerical range.

The reproduction track width may be appropriately selected by a person skilled in the art in consideration of the ratio of (reproduction track width/recording track width). The reproduction track width is determined by a reproduction head used for reproducing the magnetic recording medium 10.

The reproduction track width may be, for example, 2.00 μm or less, favorably 1.80 μm or less, more favorably 1.60 μm or less, and still more favorably 1.40 μm or less.

The reproduction track width may be, for example, 0.20 μm or more, favorably 0.30 μm or more, more favorably 0.40 μm or more, and still more favorably 0.50 μm or more.

The reproduction track width of the magnetic recording medium 10 may fall within the above numerical range, for example, 0.40 μm or more and 2.50 μm or less, favorably 0.50 μm or more and 2.20 μm or less, and more favorably 0.60 μm or more and 2.00 μm or less.

(Specific Example of Servo Patterns)

Figure 3:
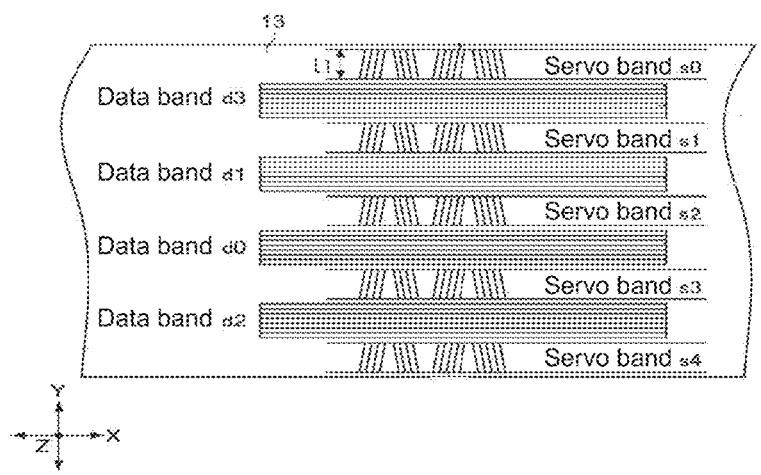
FIG. 3 is a diagram showing an example of a servo pattern in the servo band.
Figure 4:
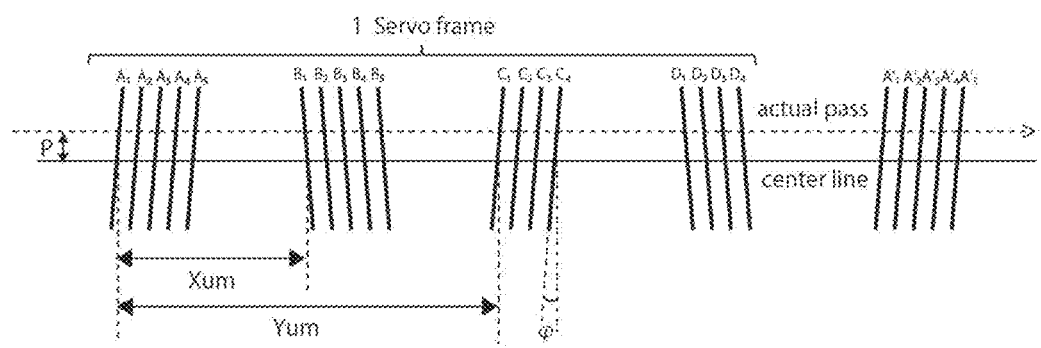
FIG. 4 is a diagram showing an example of a servo pattern in the servo band.

A more specific example of the servo pattern recorded on the magnetic layer 13 of the magnetic recording medium of the present technology will be described below with reference to FIGS. 3 and 4. FIG. 3 is a schematic diagram of data bands and servo bands formed in the magnetic layer 13 of the magnetic recording medium 10. FIG. 4 is a diagram showing a servo pattern of each servo band.

As shown in FIG. 3, the magnetic layer 13 includes four data bands d0 to d3. The magnetic layer 13 includes a total of five servo bands S0 to S4 so as to sandwich each data band between two servo bands.

As shown in FIG. 4, each servo band repeatedly has a frame unit (one servo frame) including five linear servo patterns (e.g., servo patterns A1 to A5) inclined at a predetermined angle φ, five linear servo patterns (e.g., servo patterns B1 to B5) inclined at the same angle as that signal in the opposite direction, four linear servo patterns (e.g., servo patterns C1 to C4) inclined at a predetermined angle φ, and four linear servo patterns (e.g., servo patterns D1 to D4) inclined at the same angle as that signal in the opposite direction. The predetermined angle φ may be, for example, 5° to 25°, particularly 11° to 25°.

A servo band width L1 (see FIG. 3) of each of the servo bands S0 to S4 may be, for example, 100 μm or less, particularly 60 μm or less, more particularly 50 μm or less, and still more particularly 40 μm or less. The servo band width L1 may be, for example, 15 μm or more, and particularly 25 μm or more.

(Magnetic Powder)

Examples of magnetic particles forming the magnetic powder contained in the magnetic layer 13 include, but are not limited to, hexagonal ferrite, epsilon-type iron oxide (ε-iron oxide), Co-containing spinel ferrite, gamma hematite, magnetite, dichromium dioxide, cobalt-deposited iron oxide, and metal. The magnetic powder may be one of these, or may be a combination of two or more of them. It is favorable that the magnetic powder can contain hexagonal ferrite, ε-iron oxide, or Co-containing spinel ferrite. Particularly favorably, the magnetic powder is hexagonal ferrite. The hexagonal ferrite may particularly favorably contain at least one of Ba or Sr. The ε-iron oxide may particularly favorably contain at least one of Al or Ga. These magnetic particles may be appropriately selected by those skilled in the art on the basis of factors such as the method of producing the magnetic layer 13, the standard of the tape, and the function of the tape.

The shape of the magnetic particles depends on the crystalline structure of the magnetic particles. For example, barium ferrite (BaFe) and strontium ferrite may have a hexagonal plate shape. ε-iron oxide may be spherical. Cobalt ferrite may be cubic. The metal may be spindle-shaped. These magnetic particles are oriented in the process of producing the magnetic recording medium 10.

The average particle size of the magnetic powder may be favorably 50 nm or less, more favorably 40 nm or less, and still more favorably 30 nm or less, 25 nm or less, 22 nm or less, 21 nm or less, or 20 nm or less. The average particle size may be, for example, 10 nm or more, and favorably 12 nm or more.

The average aspect ratio of the magnetic powder may be favorably 1.0 or more and 3.5 or less, more favorably 1.0 or more and 3.1 or less, still more favorably 1.0 or more and 2.8 or less, and particularly favorably 1.1 or more and 2.5 or less.

(Embodiment in which Magnetic Powder Contains Hexagonal Ferrite)

According to a favorable embodiment of the present technology, the magnetic powder may contain hexagonal ferrite, more particularly a powder of nanoparticles containing hexagonal ferrite (hereinafter, referred to as "hexagonal ferrite particles"). Hexagonal ferrite particles have, for example, a hexagonal plate shape or a substantially hexagonal plate shape. Hexagonal ferrite may contain favorably at least one of Ba, Sr, Pb, or Ca, and more favorably at least one of Ba or Sr. Hexagonal ferrite may specifically be, for example, barium ferrite or strontium ferrite. Barium ferrite may further contain at least one of Sr, Pb, or Ca in addition to Ba. Strontium ferrite may further contain at least one of Ba, Pb, or Ca in addition to Sr.

More specifically, hexagonal ferrite may have an average composition represented by the general formula $MFe_{12}O_{19}$. Here, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the above-mentioned general formula, some Fe may be substituted by other meatal elements.

In the case where the magnetic powder contains a powder of hexagonal ferrite particles, the average particle size of the magnetic powder may be favorably 50 nm or less, more favorably 40 nm or less, and still more favorably 30 nm or less, 25 nm or less, 22 nm or less, 21 nm or less, or 20 nm or less. The average particle size may be, for example, 10 nm or more, favorably 12 nm or more, and more favorably 15 nm or more. For example, the average particle size of the magnetic powder may be 10 nm or more and 50 nm or less, 10 nm or more and 40 nm or less, 12 nm or more and 30 nm or less, 12 nm or more and 25 nm or less, or 15 nm or more and 22 nm or less. In the case where the average particle size of the magnetic powder is less than or equal to the above-mentioned upper limit value (e.g., 50 nm or less, particularly 30 nm or less), favorable electromagnetic conversion characteristics (e.g., SNR) can be obtained in the magnetic recording medium 10 having high recording density. In the case where the average particle size of the magnetic powder is not less than the above-mentioned lower limit value (e.g., 10 nm or more, favorably 12 nm or more), the dispersibility of the magnetic powder is further improved, and more excellent electromagnetic conversion characteristics (e.g., SNR) can be obtained.

In the case where the magnetic powder contains a powder of hexagonal ferrite particles, the average aspect ratio of the magnetic powder may favorably be 1 or more and 3.5 or less, more favorably 1 or more and 3.1 or less, or 2 or more and 3.1 or less, and still more favorably 2 or more and 3 or less. When the average aspect ratio of the magnetic powder is within the above-mentioned numerical range, it is possible to suppress aggregation of the magnetic powder and suppress the resistance applied to the magnetic powder at the time when causing the magnetic powder to be perpendicularly oriented in the step of forming the magnetic layer 13. This may result in improvement in the perpendicular orientation of the magnetic powder.

In the case where the magnetic powder contains a powder of hexagonal ferrite particles, the average particle size and the average aspect ratio of the magnetic powder are obtained as follows.

First, the magnetic recording medium 10 to be measured is processed by the FIB (Focused Ion Beam) method or the like to obtain a slice. In the case of using the FIB method, a carbon film and a tungsten thin film are formed as a protective film in pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

Using a transmission electron microscope (H-9500 manufactured by Hitachi High-Tech Corporation), the above-mentioned cross section of the obtained slice sample is observed such that the entire magnetic layer 13 is included with respect to the thickness direction of the magnetic layer 13 at an acceleration voltage of 200 kV and the total magnification of 500,000 times, and a TEM photograph is taken.

Figure 9:
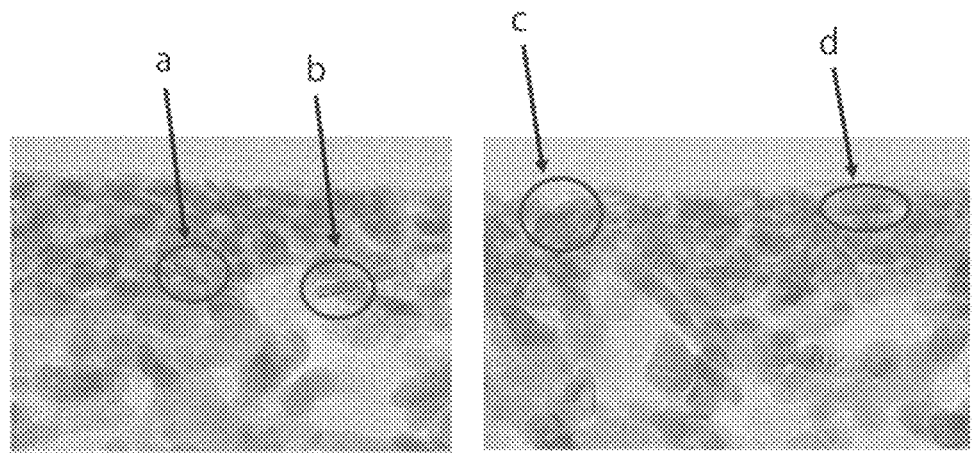
FIG. 9 is an example of a TEM photograph of a magnetic layer.

Next, 50 particles whose side surface is oriented in the direction of the observation surface and whose thickness can be clearly observed are selected from the obtained TEM photograph. For example, FIG. 9 shows an example of the TEM photograph. In FIG. 9, for example, particles indicated by a and d are selected because the thickness thereof can be clearly observed. A maximum plate thickness DA for each of the 50 selected particles is measured. The maximum plate thicknesses DA thus obtained are simply averaged (arithmetically averaged) to obtain an average maximum plate thickness $DA_{ave}$.

Subsequently, a plate diameter DB of each of the magnetic powders is measured. In order to measure the plate diameter DB of the particles, 50 particles whose plate diameter of the particle can be clearly observed are selected from the obtained TEM photograph. For example, in FIG. 9, particles indicated by b and c are selected because the plate diameter thereof can be clearly observed. The plate diameter DB of each of the 50 selected particles is measured. The plate diameters DB thus obtained are simply averaged (arithmetically averaged) to obtain an average plate diameter $DB_{ave}$. The average plate diameter $DB_{ave}$ is the average particle size.

Then, an average aspect ratio ($DB_{ave}/DA_{ave}$) of the particles is obtained from the average maximum plate thickness $DA_{ave}$ and the average plate diameter $DB_{ave}$.

In the case where the magnetic powder contains a powder of hexagonal ferrite particles, the average particle volume of the magnetic powder is favorably 5,900 $nm^3$ or less, more favorably 3,400 $nm^3$ or less, still more favorably 2,500 $nm^3$ or less, still more favorably 1,500 $nm^3$ or less, and particularly favorably 1,300 $nm^3$ or less. Further, the average particle volume of the magnetic powder is favorably 500 $nm^3$ or more and 3,400 $nm^3$ or less, more favorably 1,000 $nm^3$ or more and 2,500 $nm^3$ or less, still more favorably 1,000 $nm^3$ or more and 1,500 $nm^3$ or less, and still more favorably 1,000 $nm^3$ or more and 1,300 $nm^3$ or less.

In the case where the average particle volume of the magnetic powder is less than or equal to the above-mentioned upper limit value (e.g., 5,900 $nm^3$ or less), favorable electromagnetic conversion characteristics (e.g., SNR) can be obtained in the magnetic recording medium 10 having high recording density. In the case where the average particle volume of the magnetic powder is greater than or equal to the above-mentioned lower limit value (e.g., 500 $nm^3$ or more), the dispersibility of the magnetic powder is further improved, and more excellent electromagnetic conversion characteristics (e.g., SNR) can be obtained.

The average particle volume of the magnetic powder is obtained as follows. First, as described with respect to the above-mentioned method of calculating the average particle size of the magnetic powder, the average maximum plate thickness $DA_{ave}$ and the average plate diameter $DB_{ave}$ are obtained. Next, the average volume V of the magnetic powder is obtained by the following formula.

$$V = \frac{3\sqrt{3}}{8} \times DA_{ave} \times DB_{ave} \times DB_{ave}$$

In accordance with a particularly favorable embodiment of the present technology, the magnetic powder may be a barium ferrite magnetic powder or strontium ferrite magnetic powder, and may be more favorably a barium ferrite magnetic powder. The barium ferrite magnetic powder contains magnetic particles of iron oxide having barium ferrite as a main phase (hereinafter, referred to as "barium ferrite particles"). The barium ferrite magnetic powder is highly reliable in recording data, e.g., the coercive force of the barium ferrite magnetic powder does not drop even in high-temperature and high-humidity environments. From this viewpoint, the barium ferrite magnetic powder is favorable as the above-mentioned magnetic powder.

The average particle size of the barium ferrite magnetic powder is 50 nm or less, more favorably 10 nm or more and 40 nm or less, and still more favorably 12 nm or more and 25 nm or less.

In the case where the magnetic layer 13 contains barium ferrite magnetic powder as the magnetic powder, the average thickness $t_m$ [nm] of the magnetic layer 13 is favorably 35 nm$\leq t_m \leq$100 nm, and more favorably 80 nm or less.

Further, the coercive force Hc measured in the thickness direction (perpendicular direction) of the magnetic recording medium 10 is favorably 160 kA/m or more and 280 kA/m or less, more favorably 165 kA/m or more and 275 kA/m or less, and still more favorably 170 kA/m or more and 270 kA/m or less. The coercive force Hc may be more favorably 240 kA/m or less, still more favorably 225 kA/m or less, still more favorably 210 kA/m or less, and still more favorably 200 kA/m or less.

(Embodiment in which Magnetic Powder Contains ε-Iron Oxide)

In accordance with another favorable embodiment of the present technology, the above-mentioned magnetic powder may favorably contain a powder of nanoparticles containing ε-iron oxide (hereinafter, referred to as "ε-iron oxide particles"). The ε-iron oxide particles are capable of achieving a high coercive force even if the ε-iron oxide particles are fine particles. The ε-iron oxide contained in the ε-iron oxide particles is favorably crystal-oriented preferentially in the thickness direction (perpendicular direction) of the magnetic recording medium 10.

The ε-iron oxide particles each have a spherical shape or a substantially spherical shape, or each have a cubic shape or a substantially cubic shape. Since the ε-iron oxide particles have the above-mentioned shapes, in the case where ε-iron oxide particles are used as the magnetic particles, the area of contact between the particles in the thickness direction of the medium can be reduced and the aggregation of the particles can be suppressed as compared with the case of using hexagonal plate-shaped barium ferrite particles as the magnetic particles. Therefore, it is possible to increase the dispersibility of the magnetic powder and achieve a more favorable SNR (Signal-to-Noise Ratio).

Figure 5:
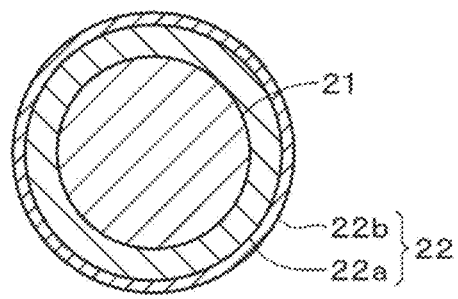
FIG. 5 is a cross-sectional view showing a configuration of magnetic particles.

The ε-iron oxide particles each have a core-shell structure. Specifically, the ε-iron oxide particles each include a core portion 21 and a shell portion 22 having a two-layer structure provided around the core portion 21 as shown in FIG. 5. The shell portion 22 having the two-layer structure includes a first shell portion 22a provided on the core portion 21 and a second shell portion 22b provided on the first shell portion 22a.

The core portion 21 contains ε-iron oxide. The ε-iron oxide contained in the core portion 21 favorably has ε-$Fe_2O_3$ crystal as the main phase, and more favorably has a single phase of ε-$Fe_2O_3$.

The first shell portion 22a covers at least a part of the circumference of the core portion 21. Specifically, the first shell portion 22a may partially cover the periphery of the core portion 21 or may cover the entire periphery of the core portion 21. From the viewpoint of achieving sufficient exchange-coupling between the core portion 21 and the first shell portion 22a and improving magnetic properties, it is favorable to cover the entire surface of the core portion 21.

The first shell portion 22a is a so-called soft magnetic layer, and may contain a soft magnetic material such as α-Fe, a Ni—Fe alloy, and a Fe—Si—Al alloy. α-Fe may be obtained by reducing the ε-iron oxide contained in the core portion 21.

The second shell portion 22b is an oxide coating film as an oxidation prevention layer. The second shell portion 22b may contain α-iron oxide, aluminum oxide, or silicon oxide. α-iron oxide may include, for example, at least one iron oxide of $Fe_3O_4$, $Fe_2O_3$, or FeO. In the case where the first shell portion 22a contains α-Fe (soft magnetic material), the α-iron oxide may be one obtained by oxidizing α-Fe contained in the first shell portion 22a.

When the ε-iron oxide particles each have the first shell portion 22a as described above, thermal stability can be ensured. This allows the coercive force Hc of the core portion 21 alone to be kept large and/or the coercive force Hc of the ε-iron oxide particles (core-shell particles) as a whole to be adjusted to the coercive force Hc suitable for recording. In addition, when the ε-iron oxide particles each have the second shell portion 22b as described above, the deterioration of characteristics of the ε-iron oxide particles due to rust or the like generated on the surfaces of the particles by the ε-iron oxide particles being exposed to air in the process of producing the magnetic recording medium 10 and prior to the process can be suppressed. Therefore, it is possible to suppress the characteristic deterioration of the magnetic recording medium 10.

Figure 6:
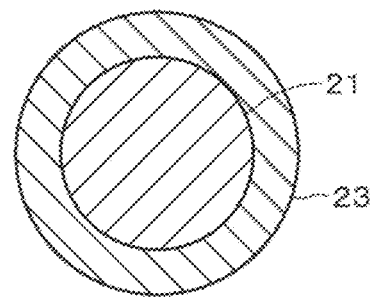
FIG. 6 is a cross-sectional view showing a configuration of magnetic particles in a modified example.

The ε-iron oxide particles may have a shell portion 23 having a single layer structure as shown in FIG. 6. In this case, the shell portion 23 has the same configuration as that of the first shell portion 22a. However, from the viewpoint of suppressing the deterioration of characteristics of the ε-iron oxide particles, it is more favorable that the ε-iron oxide particles each have the shell portion 22 having a two-layer structure.

The ε-iron oxide particles may contain an additive instead of a core-shell structure, or may contain an additive while having a core-shell structure. In these cases, some Fe of the ε-iron oxide particles are substituted by additives. Also when the ε-iron oxide particles contain an additive, the coercive force Hc of the entire ε-iron oxide particles can be adjusted to the coercive force Hc suitable for recording, so that ease of recording can be improved. The additive is a metal element other than iron, favorably a trivalent metal element, and more favorably one or more kinds selected from the group consisting of aluminum (Al), gallium (Ga), and indium (In).

Specifically, the ε-iron oxide containing an additive is ε-$Fe_{2-x}M_xO_3$ crystal (where M represents a metal element other than iron, favorably a trivalent metal element, and more favorably one or more kinds selected from the group consisting of Al, Ga, and In. x satisfies the following formula represented by: 0<x<1, for example).

The average particle size (average maximum particle size) of the magnetic powder is favorably 22 nm or less, more favorably 8 nm or more and 22 nm or less, and still more favorably 12 nm or more and 22 nm or less. In the magnetic recording medium 10, the region that is half the size of the recording wavelength is the actual magnetization region. Therefore, by setting the average particle size of the magnetic powder to half or less of the shortest recording wavelength, it is possible to obtain a favorable SNR. Therefore, when the average particle size of the magnetic powder is 22 nm or less, favorable electromagnetic conversion characteristics (e.g., SNR) can be obtained in the magnetic recording medium 10 having high recording density (e.g., the magnetic recording medium 10 configured to be capable of recording signals at the shortest recording wavelength of 44 nm or less). Meanwhile, in the case where the average particle size of the magnetic powder is 8 nm or more, the dispersibility of the powder is further improved, and more excellent electromagnetic conversion characteristics (e.g., SNR) can be obtained.

The average aspect ratio of the magnetic powder is favorably 1.0 or more and 3.5 or less, more favorably 1.0 or more and 3.1 or less, and still more favorably 1.0 or more and 2.5 or less. When the average aspect ratio of the magnetic powder is within the range of 1.0 or more and 3.5, the aggregation of the magnetic powder can be suppressed, and the resistance applied to the magnetic powder at the time when the magnetic powder is perpendicularly oriented in the step of forming the magnetic layer 13 can be suppressed. Therefore, the perpendicular orientation of the magnetic powder can be improved.

In the case where the magnetic powder contains ε-iron oxide particles, the average particle size and the average aspect ratio of the magnetic powder are obtained as follows.

First, the magnetic recording medium 10 to be measured is processed by the FIB (Focused Ion Beam) method or the like to obtain a slice. In the case of using the FIB method, a carbon film and a tungsten thin film are formed as a protective film in pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

Using a transmission electron microscope (H-9500 manufactured by Hitachi High-Tech Corporation), the above-mentioned cross section of the obtained slice sample is observed such that the entire magnetic layer 13 is included with respect to the thickness direction of the magnetic layer 13 at an acceleration voltage of 200 kV and the total magnification of 500,000 times, and a TEM photograph is taken.

Next, 50 particles whose shapes can be clearly observed are selected from the obtained TEM photograph, and the major axis length DL and the minor axis length DS of each particle are measured. Here, the major axis length DL means the largest one (so-called maximum Feret diameter) of the distances between two parallel lines drawn from all angles so as to be in contact with the contour of the particle. Meanwhile, the minor axis length DS means the largest one of the lengths of the particles in the direction perpendicular to the major axis (DL) of the particles.

Subsequently, the measured major axis lengths DL of the 50 particles are simply averaged (arithmetically averaged) to obtain an average major axis length $DL_{ave}$. The average major axis length $DL_{ave}$ thus obtained is used as an average particle size of the magnetic powder. Further, the measured minor axis lengths DS of the 50 particles are simply averaged (arithmetically averaged) to obtain an average minor axis length $DS_{ave}$. Then, an average aspect ratio ($DL_{ave}/DS_{ave}$) of the particles is obtained from the average major axis length $DL_{ave}$ and the average minor axis length $DS_{ave}$.

The average particle volume of the magnetic powder is favorably 5,500 $nm^3$ or less, more favorably 270 $nm^3$ or more and 5,500 $nm^3$ or less, and still more favorably 900 $nm^3$ or more and 5,500 $nm^3$ or less. When the average particle volume of the magnetic powder is 5,500 $nm^3$ or less, the same effect as in the case where the average particle size of the magnetic powder is 22 nm or less can be obtained. On the other hand, when the average particle volume of the magnetic powder is 270 $nm^3$ or more, the same effect as in the case where the average particle size of the magnetic powder is 8 nm or more can be obtained.

In the case where the ε-iron oxide particles are spherical or substantially spherical, the average particle volume of the magnetic powder is obtained as follows. First, the average major axis length $DL_{ave}$ is obtained in the same manner as the above-mentioned method of calculating the average particle size of the magnetic powder. Next, the average volume V of the magnetic powder is obtained by the following formula.

$$V=(\pi/6) \times DL_{ave}^3$$

In the case where the ε-iron oxide particles each have a cubic shape, the average volume of the magnetic powder is obtained as follows.

The magnetic recording medium 10 is processed by the FIB (Focused Ion Beam) method or the like to obtain a slice. In the case of using the FIB method, a carbon film and a tungsten thin film are formed as a protective film in pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

Using a transmission electron microscope (H-9500 manufactured by Hitachi High-Tech Corporation), the cross section of the obtained slice sample is observed such that the entire magnetic layer 13 is included with respect to the thickness direction of the magnetic layer 13 at an acceleration voltage of 200 kV and the total magnification of 500,000 times, and a TEM photograph is taken. Note that depending on the type of the device, the magnification and acceleration voltage may be adjusted as appropriate.

Next, 50 particles whose shapes can be clearly observed are selected from the obtained TEM photograph, and a side length DC of each particle is measured. Subsequently, the measured side lengths DC of the 50 particles are simply averaged (arithmetically averaged) to obtain an average side length $DC_{ave}$. Next, the average side length $DC_{ave}$ is used to calculate an average volume $V_{ave}$ (particle volume) of the magnetic powder from the following formula.

$$V_{ave}=DC_{ave}^{3}$$

(Embodiment in which Magnetic Powder Contains Co-Containing Spinel Ferrite)

In accordance with still another favorable embodiment of the present technology, the magnetic powder may contain a powder of nanoparticles containing Co-containing spinel ferrite (hereinafter, referred to also as "cobalt ferrite particles". That is, magnetic powder may be a cobalt-ferrite magnetic powder. The cobalt ferrite particles favorably have uniaxial crystal anisotropy. The cobalt ferrite magnetic particles each have, for example, a cubic shape or a substantially cubic shape. The Co-containing spinel ferrite may further contain, in addition to Co, one or more kinds selected from the group consisting of Ni, Mn, Al, Cu, and Zn.

The cobalt ferrite has, for example, the average composition represented by the following formula (1).

$$Co_xM_yFe_2O_z \qquad (1)$$

(However, in the formula (1), M represents, for example, one or more metals selected from the group consisting of Ni, Mn, Al, Cu, and Zn. x represents a value within the range of $0.4 \leq x \leq 1.0$. y represents a value within the range of $0 \leq y \leq 0.3$. However, x and y satisfy the following relationship: $(x+y) \leq 1.0$. z represents a value within the range of $3 \leq z \leq 4$. Some Fe may be substituted by other metal elements.)

The average particle size of the cobalt ferrite magnetic powder is favorably 25 nm or less, and more favorably 23 nm or less. The coercive force Hc of the cobalt ferrite magnetic powder is favorably 2,500 Oe or more, and more favorably 2,600 Oe or more and 3,500 Oe or less.

In the case where the magnetic powder contains a powder of cobalt ferrite particles, the average particle size of the magnetic powder is favorably 25 nm or less, and more favorably 10 nm or more and 23 nm or less. When the average particle size of the magnetic powder is 25 nm or less, favorable electromagnetic conversion characteristics (e.g., SNR) can be obtained in the magnetic recording medium 10 having high recording density. Meanwhile, when the average particle size of the magnetic powder is 10 nm or more, the dispersibility of the magnetic powder is further improved, and more excellent electromagnetic conversion characteristics (e.g., SNR) can be obtained. In the case where the magnetic powder contains a powder of cobalt ferrite particles, the average aspect ratio and average particle size of the magnetic powder are obtained in the same manner as that in the case where the magnetic powder contains ε-iron oxide particles.

The average particle volume of the magnetic powder is favorably 15,000 nm³ or less, more favorably 1,000 nm³ or more and 12,000 nm³ or less. When the average particle volume of the magnetic powder is 15,000 nm³ or less, the same effect as in the case where the average particle size of the magnetic powder is 25 nm or less can be obtained. On the other hand, when the average particle volume of the magnetic powder is 1,000 nm³ or more, the same effect as in the case where the average particle size of the magnetic powder is 10 nm or more can be obtained. Note that the average particle volume of the magnetic powder is the same as the method of calculating the average particle volume in the case where the ε-iron oxide particles each have a cubic shape.

(Lubricant)

The above-mentioned magnetic layer contains a lubricant. The above-mentioned lubricant may be one or two or more kinds selected from fatty acids and fatty acid esters, and may favorably include both fatty acids and fatty acid esters.

The above-mentioned fatty acid may be favorably a compound represented by the following general formula (1) or (2). For example, one of the compound represented by the following general formula (1) and the compound represented by the general formula (2) may be contained as the above-mentioned fatty acid, or both of them may be contained.

Further, the above-mentioned fatty acid ester may be favorably a compound represented by the following general formula (3) or (4). For example, one of the compound represented by the following general formula (3) and the compound represented by the general formula (4) may be contained as the above-mentioned fatty acid ester, or both of them may be contained.

When the above-mentioned lubricant includes one or both of the compound represented by the general formula (1) and the compound represented by the general formula (2), and/or one or both of the compound represented by the general formula (3) and the compound represented by the general formula (4), it is possible to suppress the increase in the dynamic frictional coefficient due to the repetitive recording or reproduction of the magnetic recording medium.

$$CH_3(CH_2)_kCOOH \qquad (1)$$

(However, in the general formula (1), k represents an integer selected from the range of 14 or more and 22 or less, and more favorably the range of 14 or more and 18 or less.)

$$CH_3(CH_2)_nCH{=}CH(CH_2)_mCOOH \qquad (2)$$

(However, in the above-mentioned general formula (2), the sum of n and m is an integer selected from the range of 12 or more and 20 or less, and more favorably the range of 14 or more and 18 or less.)

$$CH_3(CH_2)_pCOO(CH_2)_qCH_3 \qquad (3)$$

(However, in the general formula (3), p represents an integer selected from the range of 14 or more and 22 or less, and more favorably 14 or more and 18 or less, and q represents an integer selected from the range of 2 or more and 5 or less, and more favorably the range of 2 or more and 4 or less.)

$$CH_3(CH_2)_rCOO{-}(CH_2)_sCH(CH_3)_2 \qquad (4)$$

(However, in the above-mentioned general formula (4), r represents an integer selected from the range of 14 or more and 22 or less, and s represents an integer selected from the range of 1 or more and 3 or less.)

(Binder)

As the binder, a resin having a structure in which a crosslinking reaction is performed on a polyurethane resin, a vinyl chloride resin, or the like is favorable. However, the binder is not limited thereto, and other resins may be appropriately blended depending on the physical properties required for the magnetic recording medium 10, and the like. The resin to be blended is not particularly limited as long as it is a resin commonly used in the coating-type magnetic recording medium 10.

As the binder, for example, one selected from the group consisting of polyvinyl chloride, polyvinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, and synthetic rubber, or a combination of two or more of them is used.

Further, as the binder, a thermosetting resin or a reactive resin may be used. Examples of the thermosetting resin or reactive resin include a phenol resin, an epoxy resin, a urea resin, a melamine resin, an alkyd resin, a silicone resin, a polyamine resin, and a urea formaldehyde resin.

In addition, a polar functional group such as —$SO_3M$, —$OSO_3M$, —COOM, and P=O(OM)$_2$ may be introduced into each of the above-mentioned binders for the purpose of improving dispersibility of the magnetic powder. Here, M represents a hydrogen atom, or an alkali metal such as lithium, potassium, and sodium.

Further, examples of the polar functional groups include those of the side chain type having a terminal group of —NR1R2, —NR1R2R3$^+$X$^-$, and those of the main chain type of >NR1R2$^+$X$^+$. Here, in the formula, R1, R2, and R3 each represent a hydrogen atom or a hydrocarbon group independently from each other, and X$^+$ represents, for example, a halogen element ion such as fluorine, chlorine, bromine, and iodine, or an inorganic or organic ion. Further, examples of the polar functional group include —OH, —SH, —CN, and epoxy groups.

(Additive)

The magnetic layer 13 may further contain, as the non-magnetic reinforcing particles, aluminum oxide (α, β, or γ alumina), chromium oxide, silicon oxide, diamond, garnet, emery, boron nitride, titanium carbide, silicon carbide, titanium carbide, titanium oxide (rutile or anatase type titanium oxide), and the like.

(Underlayer)

The underlayer 12 is a non-magnetic layer containing a non-magnetic powder and a binder as main components. The underlayer 12 further contains a lubricant. The description regarding the binder and the lubricant contained in the magnetic layer 13 also applies to the binder and the lubricant contained in the underlayer 12. The underlayer 12 may further contain at least one additive of conductive particles, a curing agent, a rust inhibitor, or the like as necessary.

The average thickness of the underlayer 12 is favorably 0.6 µm or more and 2.0 µm or less, and more favorably 0.8 µm or more and 1.4 µm or less. Note that the average thickness of the underlayer 12 is obtained in the same manner as the average thickness $t_m$ of the magnetic layer 13. However, the magnification of the TEM image is appropriately adjusted in accordance with the thickness of the underlayer 12.

(Non-Magnetic Powder)

The non-magnetic powder contained in the underlayer 12 may include, for example, at least one selected from inorganic particles and organic particles. One type of non-magnetic powder may be used alone, or two or more types of non-magnetic powders may be used in combination. The inorganic particles include, for example, one selected from a metal, a metal oxide, a metal carbonate, a metal sulfate, a metal nitride, a metal carbide, and a metal sulfide, or a combination of two or more of them. More specifically, the inorganic particles may be, for example, one or two or more types selected from iron oxyhydroxide, hematite, titanium oxide, and carbon black. Examples of the shape of the non-magnetic powder include various shapes such as a needle shape, a spherical shape, a cubic shape, and a plate shape, but are not particularly limited to these shapes.

(Back Layer)

The back layer 14 may contain a binder and a non-magnetic powder. The back layer 14 may contain various additives such as a lubricant, a curing agent, and an antistatic agent as necessary. The description regarding the binder and the non-magnetic powder contained in the above-mentioned underlayer 12 also applies to the binder and the non-magnetic powder contained in the back layer 14.

The average thickness $t_b$ of the back layer 14 is favorably $t_b \le 0.6$ µm, more favorably $t_b \le 0.3$ µm, and still more favorably $t_b \le 0.2$ When the average thickness $t_b$ of the back layer 14 is within the above-mentioned range, the average thickness of the underlayer 12 and the base layer 11 can be kept thick even if the average thickness $t_T$ of the magnetic recording medium 10 is set to $t_T \le 5.4$ µm. As a result, it is possible to maintain the traveling stability of the magnetic recording medium 10 in a recording/reproduction apparatus.

The average thickness $t_b$ of the back layer 14 is obtained as follows. First, the average thickness $t_T$ of the magnetic recording medium 10 is measured. The method of measuring the average thickness $t_T$ is described in the section "(3) Physical properties and structure".

Subsequently, the back layer 14 of the sample is removed with a solvent such as MEK (methyl ethyl ketone) or dilute hydrochloric acid. Next, the thickness of the sample is measured at five or more points using a laser hologage (LGH-110C) manufactured by Mitutoyo Corporation, and the measured values are simply averaged (arithmetically averaged) to calculate an average value $t_B$ [µm]. After that, the average thickness $t_b$ [µm] of the back layer 14 is obtained from the following formula. Note that the measurement positions are randomly selected from the sample.

$$t_b \text{ [µm]} = t_T \text{ [µm]} - t_B \text{ [µm]}$$

Of the two surfaces of the back layer 14, the surface forming the surface of the back layer side of the magnetic recording medium 10 is favorably provided with a plurality of protrusions. When the magnetic recording medium 10 is wound in a roll shape, a large number of pores may be formed in the magnetic layer 13 by the large number of protrusions.

The projections may be formed, for example, by inclusion of particles in a coating material for forming a back layer. The particles may be inorganic particles such as carbon black. The particle size of the particles may be appropriately selected in accordance with the size of the pores to be formed in the magnetic layer 13.

The average particle size of the particles (particularly, inorganic particles) contained in the back layer 14 is favorably 10 nm or more and 300 nm or less, and more favorably 20 nm or more and 270 nm or less. The average particle size of the non-magnetic powder is obtained in a way similar to that for the average particle size of the above-mentioned magnetic particle.

Further, the non-magnetic powder may have a particle size distribution of 2 or more.

(3) Physical Properties and Structure (Average Thickness $t_T$ of Magnetic Recording Medium)

The average thickness $t_T$ of the magnetic recording medium 10 is 5.4 µm or less, more favorably 5.3 µm or less, and still more favorably 5.2 µm or less, 5.0 µm or less, or 4.6 µm or less. When the average thickness $t_T$ of the magnetic recording medium 10 is within the above-mentioned numerical range (e.g., $t_T \leq 5.4$ µm), the recording capacity recordable in one data cartridge can be increased as compared with the existing data cartridge. The lower limit value of the average thickness $t_T$ of the magnetic recording medium 10 is not particularly limited, but satisfies the relationship: 3.5 µm$\leq t_T$, for example.

The average thickness $t_T$ of the magnetic recording medium 10 is obtained as follows. First, the magnetic recording medium 10 having a ½ inch width is prepared and cut into a 250 mm length to prepare a sample. Next, using a laser hologage (LGH-110C) manufactured by Mitutoyo Corporation as a measuring device, the thickness of the sample is measured at five or more points, and the measured values are simply averaged (arithmetically averaged) to calculate the average value $t_T$ [µm]. Note that the measurement positions are randomly selected from the sample.

(Switching Temperature and Contraction Start Temperature)

The magnetic recording medium 10 has a switching temperature for switching from thermal expansion to thermal contraction of 70° C. or more, favorably 75° C. or more, and more favorably 80° C. or more, and a contraction start temperature of 90° C. or more, favorably 95° C. or more, and more favorably 100° C. or more, at which the length in the longitudinal direction is shorter than the length at 40° C., when a thermomechanical analysis is performed in a temperature range of 40° C. to 150° C. at a temperature rise rate of 1° C./min. If the temperature at which the thermal expansion is switched to the thermal contraction is less than 70° C., the tape contracts in the long-term storage even in the use environment (particularly in the environment where the temperature is high) and a change in the width direction increases after the long-term storage, making it difficult to read and write data. The same hold true for the contraction start temperature. Further, when this temperature is lower than 90° C., contraction starts in a step in which the magnetic recording medium is exposed to a high temperature in the production process, a change in tension or a change in width accompanied by the change in tension occur, and the shape of the magnetic recording medium becomes more unstable. When the switching temperature and the contraction start temperature are within the above-mentioned numerical range, the reproduction or recording can be performed satisfactorily even after long-term storage.

Further, the switching temperature may be, for example, 120° C. or less, 110° C. or less, or 100° C. or less.

The contraction start temperature may be, for example, 130° C. or less, 120° C. or less, or 110° C. or less.

Specifically, the measurement of the switching temperature and the contraction start temperature is performed as follows.

First, the magnetic recording medium 10 is cut into a length of 30 mm (the measurement target portion of 10.0 mm+the sample fixing portion) and a width of 4.0 mm to produce a sample. Next, the sample is set in a thermomechanical analyzer (TMA/SS7100) manufactured by Hitachi High-Tech Science Corporation, and when the temperature is raised from 40° C. to 150° C., a change in load for maintaining a state in which the sample is extended by 5 µm is measured. The temperature rise time is set to 1° C./minute, the sampling time is set to 1 time/second, and the measurement is performed in an environment where nitrogen is introduced. From the measured change in load, the temperature at which the sample switches from thermal expansion to thermal contraction is used as the switching temperature, and the temperature at which the length of the sample in the longitudinal direction is shorter than the length at 40° C. is used as the contraction start temperature.

Figure 12:
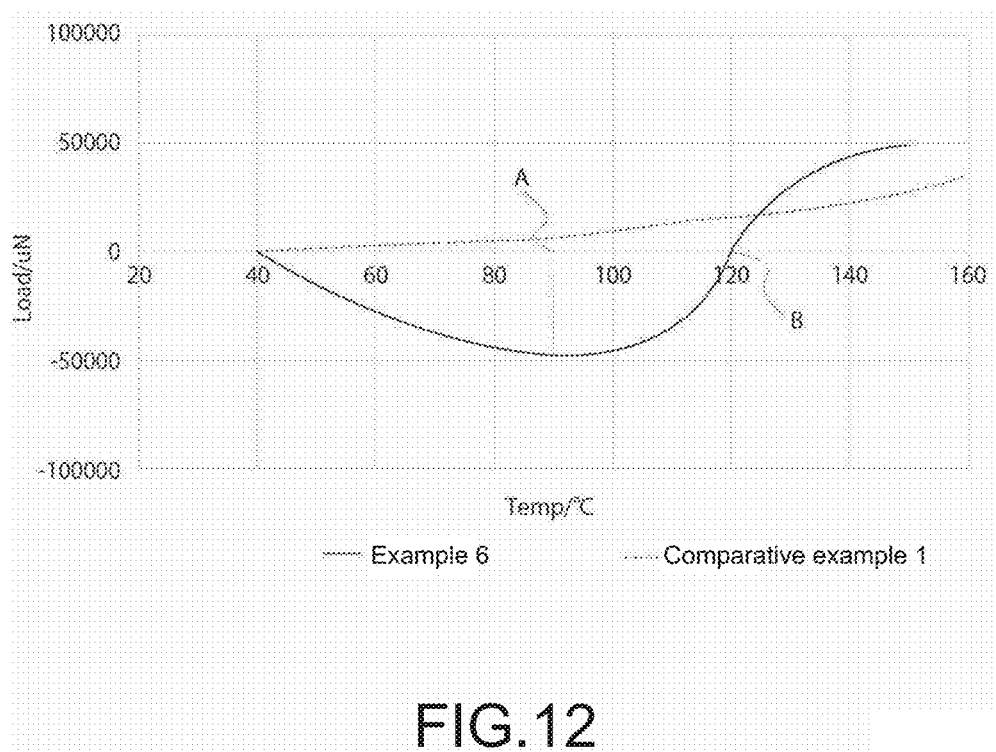
FIG. 12 is an example of a measurement result by a thermomechanical analyzer.

Examples of the switching temperature and the contraction start temperature will be described with reference to FIG. 12. As shown in FIG. 12, a temperature A when the load for maintaining the state in which the sample is extended by 5 µm changes from a decrease to an increase is the switching temperature. Further, a temperature B at the position where the temperature is further increased from the switching temperature and the load crosses the X-axis is the contraction start temperature.

(Poisson's Ratio)

The Poisson's ratio of the magnetic recording medium 10 is 0.40 or less, favorably 0.38 or less, and more favorably 0.36 or less. When the Poisson's ratio is larger than the upper limit value (for example, 0.4), the amount of change in width with respect to the tension becomes too large, and thus it becomes difficult to reduce the change in width in the production process, particularly the change in width at the time of cutting.

Further, the Poisson's ratio of the magnetic recording medium according to the present technology may be, for example, 0.10 or more, favorably 0.15 or more, more favorably 0.25 or more, and still more favorably 0.30 or more. When the Poisson's ratio is smaller than the lower limit value (for example, 0.1), the change in the width direction of the magnetic recording medium is reduced even if the longitudinal tension of the magnetic recording medium is changed, so that it is impossible to cause the change in width due to the tension.

Further, when the switching temperature and the contraction start temperature are within the numerical range described above and the Poisson's ratio is within the numerical range described above, it is possible to suppress the alleviation of the strain during long-term storage and to control the change in the width direction with respect to the tension in the longitudinal direction within a favorable range. As a result, recording and/or reproduction of a data signal after long-term storage can be performed better.

The Poisson's ratio is obtained as follows. First, the magnetic recording medium 10 having a ½ inch width is prepared and cut into a length of 150 mm to produce a sample. The longitudinal ends of the sample are chucked such that the distance between the chucks is 100 mm, and are applied with the initial load of 0.5 N. At that time, the longitudinal length of the sample is set as the initial length, and the width of the sample is set as the initial width. Subsequently, the amount of dimensional change in the longitudinal length of the tensile is measured using a tensile tester (manufactured by Shimadzu Corporation, AG-100D) at a tensile speed of 0.5 mm/min, and the amount of dimensional change in the width is measured using a digital dimension measuring instrument LS-7000 manufactured by Keyence Corporation. After that, the Poisson's ratio ρ is obtained from the following formula.

$$\rho = \frac{\left\{\frac{\text{(Amount of dimensional change in width [mm])}}{\text{(Initial width [mm])}}\right\}}{\left\{\frac{\text{(Amount of dimensional change in length [mm])}}{\text{(Initial length [mm])}}\right\}}$$

The above measurement using the tensile tester (manufactured by Shimadzu Corporation, AG-100D) is performed as follows.

First, the magnetic recording medium 10 having a ½ inch width is cut to a length of 150 mm to prepare a measurement sample. Under a constant environment of a temperature of 25° C. and a relative humidity of 50%, the tensile tester is fitted with two jigs to which the measurement sample can be fixed so as to cover its entire width. The two jigs chuck the respective two ends of the measurement sample in the length direction. The distance between the chucks is 100 mm. After chucking the measurement sample, stress is gradually applied so as to pull the measurement sample in the longitudinal direction. The tensile speed is set to 0.5 mm/min. The amount of elongation is measured when the stress is changed from 0.5 N to 1.0 N. The amount of elongation corresponds to the amount of dimensional change in length. Further, the amount of change in the width direction of the longitudinal central portion at the time of change of the stress (the position of 50 mm from the chuck) corresponds to the amount of dimensional change in width.

(Contraction Ratio in Width Direction)

The contraction ratio of the magnetic recording medium 10 in the width direction is favorably −0.035% or more, more favorably −0.030% or more, and still more favorably −0.028 or more. The fact that the contraction ratio in the width direction is within the above-mentioned numerical range may contribute to the fact that the suitability for use in the recording/reproduction apparatus is not changed even if the magnetic recording medium is stored for a long time. The unchanged suitability prevents undesirable phenomena for magnetic recording, such as an off-track phenomenon, from occurring. Further, the contraction ratio in the width direction may be, for example, 0.00% or less.

The contraction ratio in the width direction is obtained as follows. First, the magnetic recording medium 10 having a ½ inch width is prepared and cut into a length of 50 mm to produce a sample. On the surface of the magnetic layer side of the sample, two indentations are made with a needle (shape of the needle: triangular pyramid, elevation angle of the needle with respect to the surface: 110 degrees) with a distance of approximately 15 mm in the longitudinal direction and approximately 10 mm in the width direction therebetween, and a distance T1 [mm] in the width direction between the two points is measured using a microscope TUM-220ES and a measuring data processor COORDINATE COMPUTER CA-1B manufactured by TOPCON Corporation. Next, the sample is then stored without tension in a thermostatic oven placed in a room environment at a temperature of 25° C. and a humidity of 45 to 55% and set at a temperature of 60° C. (the humidity is not set) for 72 hours. Subsequently, the sample is taken out from the thermostatic oven, left at room temperature for one hour, and then a distance T2 [mm] in the width direction between the two points of the sample is measured by the same method as the measurement method of T1. Thereafter, the contraction ratio in the width direction is obtained from the following formula.

Contraction ratio in width direction [%]=((*T*1−*T*2)/*T*1)×100

As described above, three samples having a length of 50 mm are cut out from a tape of 1 m at substantially equal intervals, and the same measurement is performed on the three samples. The mean value of the contraction ratio in the width direction [%] of the samples is defined as the contraction ratio in the width direction [%].

(Contraction Ratio in Longitudinal Direction)

The contraction ratio of the magnetic recording medium 10 in the longitudinal direction is favorably 0.10% or less, and more favorably 0.08% or less. The fact that the contraction ratio in the longitudinal direction is within the above-mentioned numerical range may contribute to the fact that the suitability for use in the recording/reproduction apparatus is not changed even if the magnetic recording medium is stored for a long period of time. The unchanged suitability prevents undesirable phenomena for magnetic recording, such as an off-track phenomenon, from occurring. Further, the contraction ratio in the longitudinal direction may be, for example, 0.00% or more.

The contraction ratio in the longitudinal direction is obtained in the same manner as the contraction ratio in the width direction except that a distance L1 [mm] in the longitudinal direction of the sample and a distance L2 [mm] in the longitudinal direction of the sample after storage are measured, and the contraction ratio in the longitudinal direction is obtained from the following formula.

Contraction Ratio in Longitudinal Direction (%)=((*L*1−*L*2)/*L*1)×100

Note that the contraction ratio can be adjusted, for example, as follows. In order to suppress the contraction in the magnetic recording medium 10, for example, the base tension may be adjusted in the coating step or the drying step for the magnetic recording medium 10, or the winding tension may be adjusted in the coating step. Further, in order to alleviate the contraction occurring in the magnetic recording medium 10, for example, the magnetic recording medium 10 may be stored in a cartridge in an environment at 50° C. and at Rh of 50% for 2 to 10 days, or may be stored in an environment at 50 to 80° C. for 15 to 100 hours in the production process after the curing step of the magnetic recording medium 10.

(Squareness Ratio S2 Measured in Perpendicular Direction)

The squareness ratio S2 measured in the perpendicular direction (thickness direction) of the magnetic recording medium 10 is favorably 65% or more, more favorably 70% or more, still more favorably 73% or more, and still more favorably 80% or more. When the squareness ratio S2 is 65% or more, the perpendicular orientation of the magnetic powder becomes sufficiently high, and therefore a more excellent SNR can be obtained. Therefore, it is possible to obtain better electromagnetic conversion characteristics. Further, the servo signal shape is improved, and the control of the drive side is more easily performed.

In this specification, the perpendicular orientation of the magnetic recording medium may mean that the squareness ratio S2 of the magnetic recording medium is within the above numerical range (for example, 65% or more).

The squareness ratio S2 in the perpendicular direction is obtained as follows. First, three sheets of the magnetic recording medium 10 are superimposed on each other with double-sided tapes and then punched out with a punch of φ 6.39 mm to prepare a measurement sample. At this time, markings are made with arbitrary inks that do not have magnetism such that the longitudinal direction (traveling direction) of the magnetic recording medium 10 can be recognized. Then, using a vibrating sample magnetometer (VSM), the M-H loop of the measurement sample (the entire magnetic recording medium 10) corresponding to the perpendicular direction (the thickness direction) of the magnetic recording medium 10 is measured. Next, acetone, ethanol, or the like is used to wipe off the coating film (the underlayer 12, the magnetic layer 13, the back layer 14, and the like), leaving only the base layer 11. Then, three sheets of the obtained base layers 11 are superimposed on each other with double-sided tapes, and then punched out with a punch of φ 6.39 mm to obtain a sample for background correction (hereinafter, referred to simply as a sample for correction). The VSM is then used to measure the M-H loop of the sample for correction (the base layer 11) corresponding to the perpendicular direction of the base layer 11 (the perpendicular direction of the magnetic recording medium 10).

In the measurement of the M-H loop of the measurement sample (the entire magnetic recording medium 10) and the M-H loop of the sample for correction (the base layer 11), a highly sensitive vibrating sample magnetometer "VSM-P7-15 type" manufactured by TOEI INDUSTRY CO., LTD. is used. The measurement conditions are as follows: measurement mode: full loop, the maximum magnetic field: 15 kOe, the magnetic field step: 40 bits, Time constant of Locking amp: 0.3 sec, Waiting time: 1 sec, and MH average number: 20.

After the M-H loop of the measurement sample (the entire magnetic recording medium 10) and the M-H loop of the sample for correction (the base layer 11) are obtained, background correction is performed by subtracting the M-H loop of the sample for correction (the base layer 11) from the M-H loop of the measurement sample (the entire magnetic recording medium 10) to obtain the M-H loop after background correction. The measurement/analysis program attached to the "VSM-P7-15 type" is used to calculate the background correction.

The saturation magnetization Ms (emu) and the residual magnetization Mr (emu) of the M-H loop obtained after the background correction are substituted into the following formula, and the squareness ratio S2(%) is calculated. Note that the above-mentioned measurement of the M-H loop is performed at 25° C. Further, the "demagnetizing field correction" when measuring the M-H loop in the perpendicular direction of the magnetic recording medium 10 is not performed. Note that for this calculation, the measurement/analysis program attached to the "VSM-P7-15 type" is used.

Squareness ratio $S2(\%)=(Mr/Ms)\times 100$ (Squareness Ratio S1 Measured in Longitudinal Direction)

The squareness ratio S1 measured in the longitudinal direction (traveling direction) of the magnetic recording medium 10 is favorably 35% or less, more favorably 30% or less, 27% or less, or 25% or less, and still more favorably 20% or less. When the squareness ratio S1 is 35% or less, the perpendicular orientation of the magnetic powder becomes sufficiently high, and therefore a more excellent SNR can be obtained. Therefore, it is possible to obtain better electromagnetic conversion characteristics. Further, the servo signal shape is improved, and the control of the drive side is more easily performed.

In this specification, the perpendicular orientation of the magnetic recording medium may mean that the squareness ratio S1 of the magnetic recording medium is within the above numerical range (for example, 35% or less). The magnetic recording medium according to the present technology is favorably perpendicularly oriented.

The squareness ratio S1 in the longitudinal direction is obtained in the same manner as the squareness ratio S2 except that the M-H loop is measured in the longitudinal direction (the traveling direction) of the magnetic recording medium 10 and the base layer 11.

The squareness ratios S1 and S2 are each set to a desired value by, for example, adjusting the strength of a magnetic field applied to a coating material for forming a magnetic layer, the time of application of the magnetic field to the coating material for forming a magnetic layer, the state of dispersion of the magnetic powder in the coating material for forming a magnetic layer, or the concentration of the solid content in the coating material for forming a magnetic layer. Specifically, for example, as the strength of the magnetic field increases, the squareness ratio S1 decreases, whereas the squareness ratio S2 increases. Further, as the application time of the magnetic field becomes longer, the squareness ratio S1 decreases, whereas the squareness ratio S2 increases. Further, as the dispersion state of the magnetic powder becomes better, the squareness ratio S1 decreases, whereas the squareness ratio S2 increases. Further, as the concentration of the solid content becomes lower, the square ratio S1 decreases, whereas the square ratio S2 increases. Note that the above adjustment method may be used alone or in combination of two or more.

(Arithmetic Average Roughness $R_a$)

The arithmetic average roughness $R_a$ of the surface of the magnetic layer side of the magnetic recording medium 10 (hereinafter also referred to as "magnetic surface") is favorably 2.5 nm or less, and more favorably 2.0 nm or less. When $R_a$ is 2.5 nm or less, an excellent SNR can be obtained.

The arithmetic average roughness $R_a$ is obtained as follows. First, a surface of the magnetic layer 13 is observed using AFM to obtain an AFM image of 40 μm×40 μm. The measurement is performed in which dimension 3100 manufactured by Digital Instruments and the analysis software thereof are used as the AFM, a silicon single crystal cantilever is used (Note 1), and the tapping frequencies are tuned between 200 and 400 Hz. Next, the AFM image is divided into 512×512 (=262,144) measurement points, the heights Z(i) (i: measurement point number, i=1 to 262,144) are measured at the respective measurement points, and the heights Z(i) of the measured measurement points are simply averaged (arithmetically averaged) to obtain an average height (average plane) $Z_{ave}$ HZ(1)+Z(2)++Z(262,144))/262, 144). Subsequently, deviations $Z''(i)(=|Z(i)-Z_{ave}|)$ from the average center line at the respective measurement points are obtained, and the arithmetic average roughness $R_a$[nm] (=(Z''(1)+Z''(2)+ . . . +Z''(262, 144))/262, 144) is calculated. In this case, for the image processing, filter processing performed by Flatten order 2 and Plane Fit order 3 XY is used as the data.

(Note 1) Manufactured by Nano World, SPM probe NCH normal type Point Probe L (cantilever length)=125 μm (Coercive Force Hc)

The coercive force Hc of the magnetic recording medium 10 in the longitudinal direction is favorably 2,000 Oe or less, more favorably 1,900 Oe or less, and still more favorably 1,800 Oe or less. When the coercive force Hc in the longitudinal direction is 2,000 Oe or less, since the magnetization reacts sensitively by the magnetic field in the perpendicular direction from the recording head, a favorable recording pattern can be formed.

The coercive force Hc of the magnetic recording medium 10 measured in the longitudinal direction is favorably 1,000 Oe or more. When the coercive force Hc in the longitudinal direction is 1,000 Oe or more, it is possible to suppress the demagnetization due to leakage flux from the recording head.

The above-mentioned coercive force Hc is obtained as follows. First, three sheets of the magnetic recording medium 10 are superimposed on each other with double-sided tapes, and then punched out with a punch of φ 6.39 mm to prepare a measurement sample. At this time, markings are made with arbitrary inks that do not have magnetism such that the longitudinal direction (traveling direction) of the magnetic recording medium 10 can be recognized. Then, using a vibrating sample magnetometer (VSM), the M-H loop of the measurement sample (the entire magnetic recording medium 10) corresponding to the longitudinal direction (traveling direction) of the magnetic recording medium 10 is measured. Next, acetone, ethanol, or the like is used to wipe off the coating film (the underlayer 12, the magnetic layer 13, and the back layer 14), leaving only the base layer 11. Then, three sheets of the obtained base layers 11 are superimposed on each other with double-sided tapes, and then punched out with a punch of φ 6.39 mm to prepare a sample for background correction (hereinafter, referred to simply as the "sample for correction"). The VSM is then used to measure the M-H loop of the sample for correction (the base layer 11) corresponding to the perpendicular direction of the base layer 11 (the perpendicular direction of the magnetic recording medium 10).

In the measurement of the M-H loop of the measurement sample (the entire magnetic recording medium 10) and the M-H loop of the sample for correction (the base layer 11), a highly sensitive vibrating sample magnetometer "VSM-P7-15 type" manufactured by TOEI INDUSTRY CO., LTD. is used. The measurement conditions are as follows: measurement mode: full loop, the maximum magnetic field: 15 kOe, the magnetic field step: 40 bits, Time constant of Locking amp: 0.3 sec, Waiting time: 1 sec, and MH average number: 20.

After the M-H loop of the measurement sample (the entire magnetic recording medium 10) and the M-H loop of the sample for correction (the base layer 11) are obtained, background correction is performed by subtracting the M-H loop of the sample for correction (the base layer 11) from the M-H loop of the measurement sample (the entire magnetic recording medium 10) to obtain the M-H loop after background correction. The measurement/analysis program attached to the "VSM-P7-15 type" is used to calculate the background correction.

The coercive force Hc is obtained from the obtained M-H loop after background correction. Note that for this calculation, the measurement/analysis program attached to the "VSM-P7-15 type" is used. Note that the above-mentioned measurement of the M-H loop is performed at 25° C. Further, the "demagnetizing field correction" when measuring the M-H loop in the longitudinal direction of the magnetic recording medium 10 is not performed.

(4) Method of Producing Magnetic Recording Medium

The present technology also provides a method of producing a magnetic recording medium according to the present technology. The producing method includes a laminate forming step of forming a laminate by forming an underlayer and a magnetic layer on one surface of a base layer and forming a back layer on the other surface, and a thermal history relaxation treatment step of storing the laminate obtained in the laminate forming step under a condition of 60° C. or more and 80° C. or less for 24 hours or more and 72 hours or less, and a magnetic recording medium is produced through the thermal history relaxation treatment step.

It is considered that the strain due to heat given during the production of the magnetic recording medium is alleviated by the thermal history relaxation treatment step.

The producing method according to the present technology may include, for example, a calendering step and/or a heating treatment step as the step of applying the heat during the production of the magnetic recording medium. Therefore, it is favorable that the thermal history relaxation treatment step is performed after the calendering step and/or the heating treatment step.

Hereinafter, each step included in the method of producing the magnetic recording medium 10 will be described.

(Laminate Forming Step)

In the laminate forming step, the underlayer and the magnetic layer are formed on one surface of the base layer, and the back layer is formed on the other surface, thus forming a laminate having a layer structure including the magnetic layer, the underlayer, the base layer, and the back layer stacked in this order. The formation of the magnetic layer, the underlayer, and the back layer will be described in more detail below.

First, a coating material for forming an underlayer is prepared by kneading and/or dispersing a non-magnetic powder, a binder, and the like in a solvent. Next, a coating material for forming a magnetic layer is prepared by kneading and/or dispersing a magnetic powder, a binder, and the like in a solvent. Next, a coating material for forming a back layer is prepared by kneading and/or dispersing a binder, a non-magnetic powder, and the like in a solvent. For preparing the coating material for forming a magnetic layer, the coating material for forming an underlayer, and the coating material for forming a back layer, for example, the following solvents, dispersing apparatuses and kneading apparatuses can be used.

Examples of the solvent used for preparing coating materials include a ketone solvent such as acetone, methyl ethyl ketone, methyl isobutyl ketone, and cyclohexanone; an alcohol solvent such as methanol, ethanol, and propanol; an ester solvent such as methyl acetate, ethyl acetate, butyl acetate, propyl acetate, ethyl lactate, and ethylene glycol acetate; an ether solvent such as diethylene glycol dimethyl ether, 2-ethoxyethanol, tetrahydrofuran, and dioxane; an aromatic hydrocarbon solvent such as benzene, toluene, and xylene; and a halogenated hydrocarbon solvent such as methylene chloride, ethylene chloride, carbon tetrachloride, chloroform, and chlorobenzene. These may be used alone, or a mixture of two or more of them may be used.

As the above-mentioned kneading apparatus used for the preparation of the coating materials, for example, a kneading apparatus such as a continuous twin-screw kneader, a continuous twin-screw kneader capable of diluting in multiple stages, a kneader, a pressure kneader, and a roll kneader can be used. However, the present technology is not particularly limited to these apparatuses. Further, as the above-mentioned dispersion apparatus used for the preparation of the coating materials, for example, a dispersion apparatus such as a roll mill, a ball mill, a horizontal sand mil, a perpendicular sand mil, a spike mill, a pin mill, a tower mill, a pearl mill (e.g., "DCP mill" manufactured by Eirich Co., Ltd.), a homogenizer, and an ultrasonic disperser can be used. However, the present technology is not particularly limited to these apparatuses.

Next, the coating material for forming an underlayer is applied to one main surface of the base layer 11 and dried to form the underlayer 12. Subsequently, the coating material for forming a magnetic layer is applied onto this underlayer 12 and dried to form the magnetic layer 13 on the underlayer 12. Note that during drying, the magnetic field of the magnetic powder is oriented in the thickness direction of the base layer 11 by, for example, a solenoidal coil. Further, during drying, the magnetic field of the magnetic powder may be oriented in the longitudinal direction (traveling direction) of the base layer 11 by, for example, a solenoid coil, and then oriented in the thickness direction of the base layer 11. By performing such magnetic field perpendicular orientation treatment, it is possible to improve the degree of perpendicular orientation of the magnetic powder (i.e., the squareness ratio S1). After the magnetic layer 13 is formed, the coating material for forming a back layer is applied to the other main surface of the base layer 11 and dried to form the back layer 14. As a result, the magnetic recording medium 10 is obtained.

The squareness ratios S1 and S2 may be each set to a desired value by, for example, adjusting the strength of the magnetic field applied to the coating film of the coating material for forming a magnetic layer, the concentration of the solid content in the coating material for forming a magnetic layer, or the drying conditions (e.g., drying temperature and drying time) of the coating film of the coating material for forming a magnetic layer. The strength of the magnetic field applied to the coating film is favorably not less than twice and not more than three times the coercive force of the magnetic powder. In order to further increase the squareness ratio S1 (i.e., in order to further lower the squareness ratio S2), it is favorable to improve the dispersed state of the magnetic powder in the coating material for forming a magnetic layer. Further, in order to further increase the squareness ratio S1, it is also effective to magnetize the magnetic powder at a stage before the coating material for forming a magnetic layer enters the orientation device for causing the magnetic field of the magnetic powder to be oriented. Note that the above-mentioned methods of adjusting the squareness ratios S1 and S2 may be used alone or two or more of them may be used in combination.

(Calendering Step and Heating Treatment Step)

After that, calendering treatment is performed on the laminate obtained in the laminate forming step to smooth the surface of the magnetic layer 13. Next, after winding the laminate subjected to calendering treatment in a roll shape, heating treatment is performed on the laminate in this state, thus transferring a large number of projections 14A of the surface of the back layer 14 to the surface of the magnetic layer 13. As a result, pores (a plurality of pores 13A) are formed on the surface of the magnetic layer 13.

The temperature of the heating treatment is favorably 55° C. or more and 75° C. or less. By adopting the temperature within this numerical range as the temperature of the heating treatment, the shape of the protrusion is satisfactorily transferred to the magnetic layer 13. If the temperature of the heating treatment is too low (e.g., less than 55° C.), the shape of the protrusion may be insufficiently transferred. If the temperature of the heating treatment is too high (e.g., more than 75° C.), there is a possibility that the pore amount becomes too large, and the lubricant on the surface of the magnetic layer 13 becomes excessive. Here, the temperature of the heating treatment is the temperature of the atmosphere in which the laminate is held.

The time of the heating treatment is favorably 15 hours or more and 40 hours or less. By setting the time of the heating treatment within this numerical range, the shape of the protrusion is satisfactorily transferred to the magnetic layer 13. If the time of the heating treatment is too short (for example, less than 15 hours), the shape of the protrusion may be insufficiently transferred. In order to suppress the decrease in productivity, it is desirable that the time of the heating treatment is, for example, 40 hours or less.

(Thermal History Relaxation Treatment Step)

In the thermal history relaxation treatment step, the laminate obtained in the laminate forming step (particularly, the laminate after the calendering treatment and/or the heating treatment) is stored under the condition of 50° C. or more and 80° C. or less, favorably 60° C. or more and 75° C. or less, for 10 hours or more and 100 hours or less, favorably 24 hours or more and 72 hours or less. The laminate is stored in such a manner, and thus the thermal history in the thermal history (particularly in the calendering step and/or the heating treatment step) is alleviated. It is conceived that this alleviation removes the strain.

The thermal history relaxation treatment step may further include a low tension heat treatment step of causing the laminate to travel for 15 seconds or more and 240 seconds or less, particularly 60 seconds or more and 180 seconds or less, under the condition of 80° C. or more and 150° C. or less, particularly 100° C. or more and 120° C. or less, while a tension of 0.1 N or less per ½ inch length in the width direction is applied to the laminate in the longitudinal direction. By performing the treatment of causing the laminate to traveling while applying a low tension of 0.1 N or less, it is possible to remove the strain generated in the previous steps.

(Cutting Step)

Finally, the laminate is cut into a predetermined width (e.g., ½ inch width). In this way, the target magnetic recording medium 10 is obtained. A servo pattern is recorded on the magnetic recording medium 10. The recording of the servo pattern may be performed, for example, by a servo writer known in the art.

In the above producing method, a large number of protrusions 14A provided on the surface of the back layer 14 are transferred to the surface of the magnetic layer 13 to form pores on the surface of the magnetic layer 13, but the method of forming pores is not limited thereto. For example, pores may be formed on the surface of the magnetic layer 13 by adjusting the type of solvent contained in the coating material for forming a magnetic layer and/or adjusting the drying condition of the coating material for forming a magnetic layer. Further, for example, in the process in which the solvent of the coating material for forming a magnetic layer dries, pores may be formed due to uneven distribution of the solid matter and the solvent contained in the coating material for forming a magnetic layer. Further, in the process of applying the coating material for forming a magnetic layer, the solvent contained in the coating material for forming a magnetic layer can also be absorbed into the underlayer 12 through the pores of the underlayer 12 formed when a lower layer is applied and dried. By the movement of the solvent from the underlayer 12 through the magnetic layer 13 in the drying step after the coating, pores communicating the magnetic layer 13 and the underlayer 12 can be formed.

(5) Recording/Reproduction Apparatus

[Configuration of Recording/Reproduction Apparatus]

Next, an example of a configuration of a recording/reproduction apparatus 30 for recording and reproducing the magnetic recording medium 10 having the above-mentioned configuration will be described with reference to FIG. 7.

The recording/reproduction apparatus 30 has a configuration capable of adjusting the tension applied to the longitudinal direction of the magnetic recording medium 10.

Further, the recording/reproduction apparatus 30 has a configuration in which a magnetic recording cartridge 10A can be loaded. Now, the case where for ease of description, the recording/reproduction apparatus 30 has a configuration in which a single magnetic recording cartridge 10A can be loaded will be described. However, the recording/reproduction apparatus 30 may have a configuration in which a plurality of magnetic recording cartridge 10A can be loaded.

The recording/reproduction apparatus 30 is connected via a network 43 to an information processing apparatus such as a server 41 and a personal computer (hereinafter, referred to as "PC") 42, and is configured to be capable of recording data supplied from these information processing apparatuses on the magnetic recording cartridge 10A. The shortest recording wavelength of the recording/reproduction apparatus 30 is favorably 100 nm or less, more favorably 75 nm or less, still more favorably 60 nm or less, and particularly favorably 50 nm or less.

Figure 7:
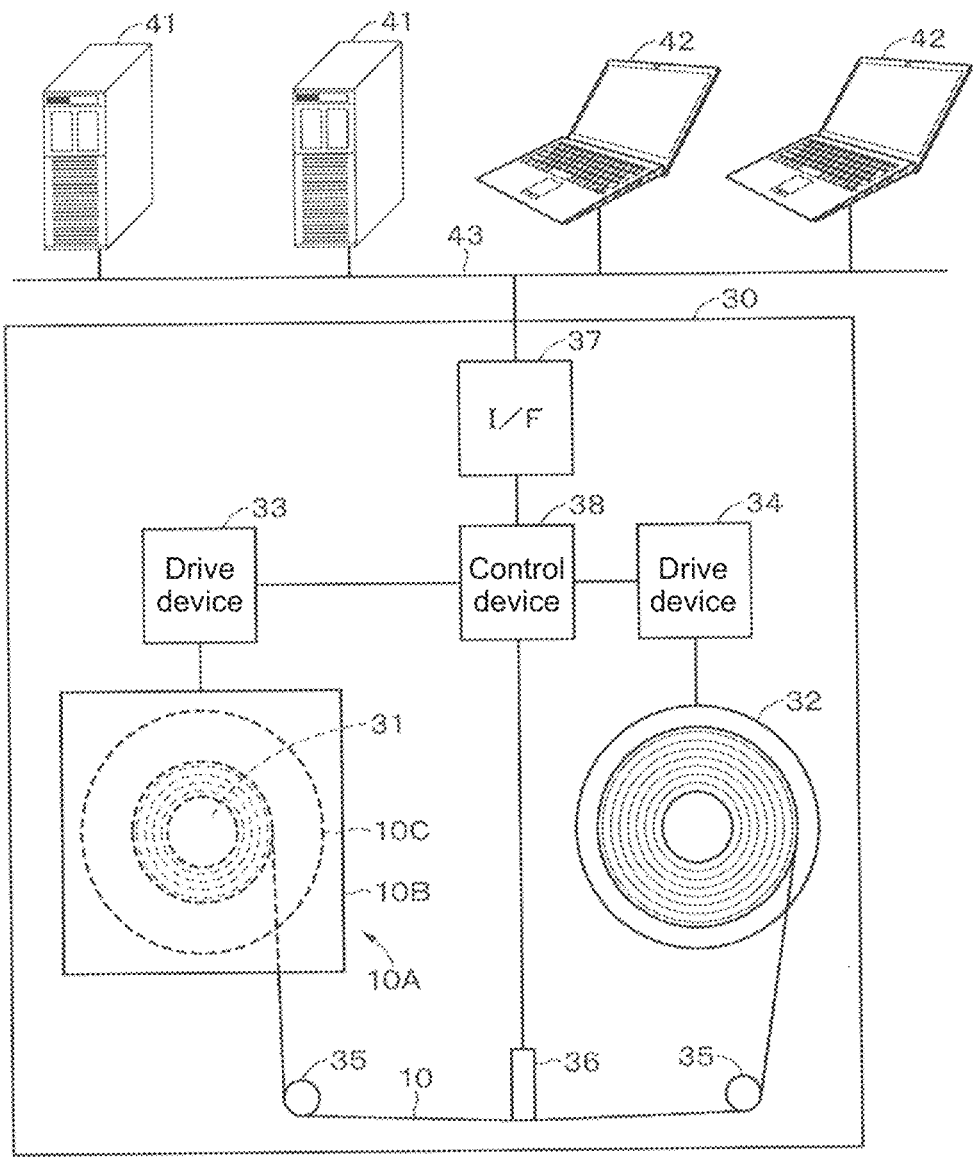
FIG. 7 is a schematic diagram showing a configuration of a recording/reproduction apparatus.

As shown in FIG. 7, the recording/reproduction apparatus 30 includes a spindle 31, a reel 32 on the side of the recording/reproduction apparatus, a spindle drive device 33, a reel drive device 34, a plurality of guide rollers 35, a head unit 36, a communication interface (hereinafter, I/F) 37, and a control device 38.

The spindle 31 is configured to be capable of loading the magnetic recording cartridge 10A. The magnetic recording cartridge 10A conforms to the LTO (Linear Tape Open) standard and rotatably houses, in a cartridge case 10B, a single reel 10C on which the magnetic recording medium 10 is wound. A servo pattern of the inverted V shape is recorded on the magnetic recording medium 10 in advance as a servo signal. The reel 32 is configured to be capable of fixing the distal end of the magnetic recording medium 10 pulled out from the magnetic recording cartridge 10A.

The spindle drive device 33 is a device that rotationally drives the spindle 31. The reel drive device 34 is a device that rotationally drives the reel 32. When recording or reproducing data on or from the magnetic recording medium 10, the spindle drive device 33 and the reel drive device 34 rotationally drive the spindle 31 and the reel 32, respectively, to drive the magnetic recording medium 10. The guide roller 35 is a roller for guiding the traveling of the magnetic recording medium 10.

The head unit 36 includes a plurality of recording heads for recording data signals on the magnetic recording medium 10, a plurality of reproduction heads for reproducing data signals recorded on the magnetic recording medium 10, and a plurality of servo heads for reproducing the servo signal recorded on the magnetic recording medium 10. As the recording head, for example, a ring-type head can be used, but the type of the recording head is not limited thereto.

The communication I/F 37 is for communicating with an information processing apparatus such as the server 41 and the PC 42 and is connected to the network 43.

The control device 38 controls the entire recording/reproduction apparatus 30. For example, the control device 38 records data signals supplied from the information processing apparatus on the magnetic recording medium 10 by the head unit 36 in response to a request from the information processing apparatus such as the server 41 and the PC 42. Further, the control device 38 reproduces the data signal recorded on the magnetic recording medium 10 and supplies the reproduced data signal to the information processing apparatus by the head unit 36 in response to a request from the information processing apparatus such as the server 41 and the PC 42.

[Operation of Recording/Reproduction Apparatus]

Next, the operation of the recording/reproduction apparatus 30 having the above-mentioned configuration will be described.

First, the magnetic recording cartridge 10A is loaded into the recording/reproduction apparatus 30, and the distal end of the magnetic recording medium 10 is pulled out, transferred to the reel 32 via the plurality of guide rollers 35 and the head unit 36, and attached to the reel 32.

Next, when an operation unit (not shown) is operated, the spindle drive device 33 and the reel drive device 34 are driven under the control of the control device 38, and the spindle 31 and the reel 32 are caused to rotate in the same direction so that the magnetic recording medium 10 travels from the reel 10C to the reel 32. As a result, while the magnetic recording medium 10 is wound on the reel 32, information is recorded on the magnetic recording medium 10 or information recorded on the magnetic recording medium 10 is reproduced by the head unit 36.

Further, in the case where the magnetic recording medium 10 is rewound to the reel 10C, the spindle 31 and the reel 32 are rotationally driven in the direction opposite to the above-mentioned direction, thereby causing the magnetic recording medium 10 to travel from the reel 32 to the reel 10C. Also in this rewinding, information is recorded on the magnetic recording medium 10 or information recorded on the magnetic recording medium 10 is reproduced by the head unit 36.

(6) Cartridge

[Configuration of Cartridge]

The present technology also provides a magnetic recording cartridge (referred to also as a tape cartridge) including the magnetic recording medium according to the present technology. In the magnetic recording cartridge, the magnetic recording medium may be wound on a reel, for example. The magnetic recording cartridge may include, for example, a communication unit that communicates with a recording/reproduction apparatus, a storage unit, and a control unit that stores, in the storage unit, the information received from the recording/reproduction apparatus via the communication unit, and reads the information from the storage unit and transmits the read information to the recording/reproduction apparatus via the communication unit in response to a request from the recording/reproduction apparatus. The information may include adjustment information for adjusting tension applied to the magnetic recording medium in the longitudinal direction.

An example of a configuration of the cartridge 10A including the magnetic recording medium 10 having the above-mentioned configuration will be described with reference to FIG. 10.

Figure 10:
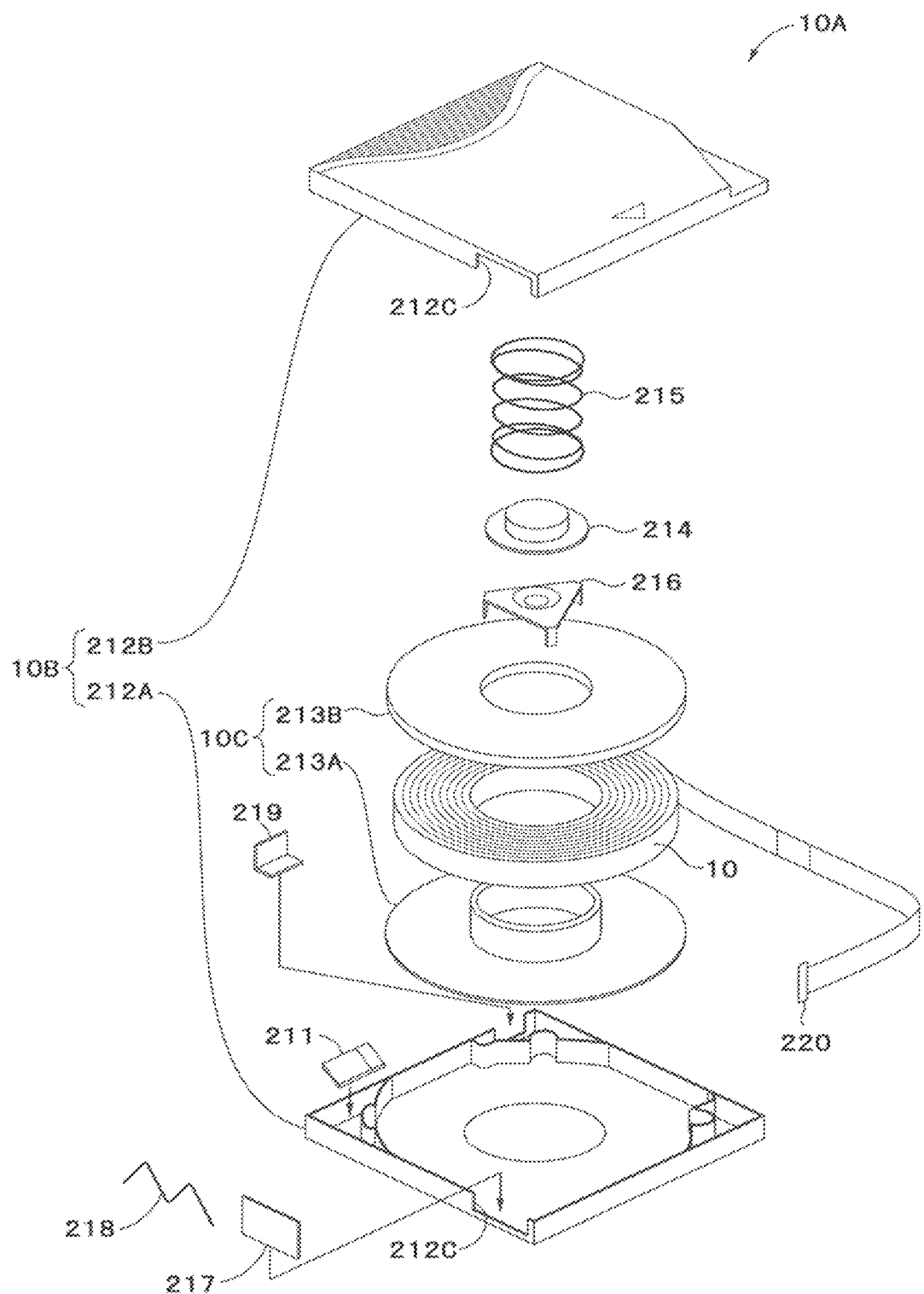
FIG. 10 is an exploded perspective view showing an example of a configuration of a cartridge.

FIG. 10 is an exploded perspective view showing an example of a configuration of the cartridge 10A. The cartridge 10A is a magnetic recording cartridge conforming to the LTO (Linear Tape-Open) standard, and includes, inside the cartridge case 10B including a lower shell 212A and an upper shell 212B, the reel 10C on which the magnetic tape (tape-shaped magnetic recording medium) 10 is wound, a reel lock 214 and a reel spring 215 for locking rotation of the reel 10C, a spider 216 for releasing the locked state of the reel 10C, a slide door 217 for opening and closing a tape outlet 212C provided on the cartridge case 10B across the lower shell 212A and the upper shell 212B, a door spring 218 that biases the slide door 217 to the closed position of the tape outlet 212C, a write protect 219 for preventing erroneous erasure, and a cartridge memory 211. The reel 10C has a substantially disk shape having an opening at its center, and includes a reel hub 213A and a flange 213B formed of a hard material such as plastics. A leader pin 220 is provided at one end of the magnetic tape 10.

The cartridge memory 211 is provided in the vicinity of one corner of the cartridge 10A. While the cartridge 10A is loaded into the recording/reproduction apparatus 30, the cartridge memory 211 is caused to face a reader/writer (not shown) of the recording/reproduction apparatus 30. The cartridge memory 211 communicates with the recording/reproduction apparatus 30, specifically, a reader/writer (not shown), using a radio communication standard conforming to the LTO standard.

[Configuration of Cartridge Memory]

An example of a configuration of the cartridge memory 211 will be described with reference to FIG. 11.

Figure 11:
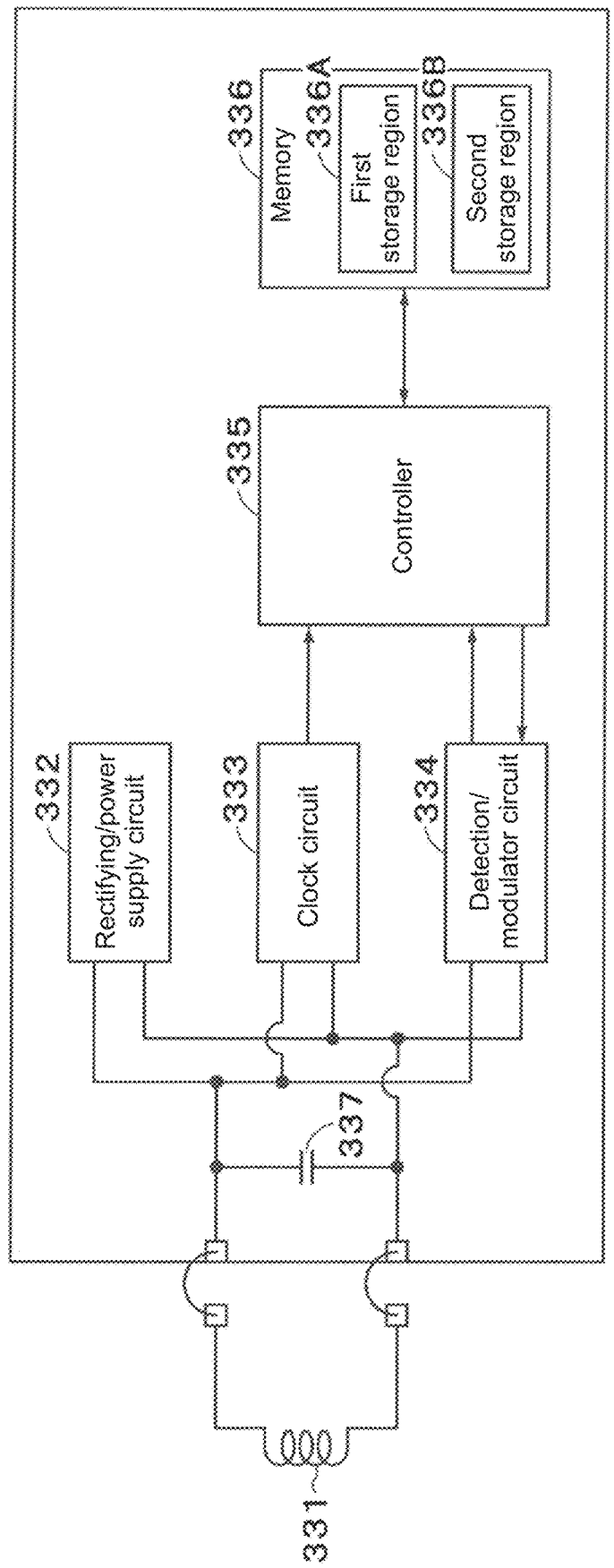
FIG. 11 is a block diagram showing an example of a configuration of a cartridge memory.

FIG. 11 is a block diagram showing an example of a configuration of the cartridge memory 211. The cartridge memory 211 includes an antenna coil (communication unit) 331 for communicating with a reader/writer (not shown) in a defined communication standard, a rectifying/power supply circuit 332 that generates and rectifies power from radio waves received by the antenna coil 331 using induced electromotive force to generate a power source, a clock circuit 333 that generates clocks using induced electromotive force similarly from radio waves received by the antenna coil 331, a detection/modulator circuit 334 for detecting radio waves received by the antenna coil 331 and modulating signals transmitted by the antenna coil 331, a controller (control unit) 335 including a logical circuit and the like for discriminating commands and data from digital signals extracted from the detection/modulator circuit 334 and processing the commands and data, and a memory (storage unit) 336 that stores information. Further, the cartridge memory 211 includes a capacitor 337 connected in parallel to the antenna coil 331, and the antenna coil 331 and the capacitor 337 constitute a resonant circuit.

The memory 336 stores information and the like relating to the cartridge 10A. The memory 336 is a non-volatile memory (NVM). The storage capacity of the memory 336 is favorably approximately 32 KB or more. For example, in the case where the cartridge 10A is compliant with LTO format standards for next and future generations, the memory 336 has a storage capacity of approximately 32 KB.

The memory 336 has a first storage region 336A and a second storage region 336B. The first storage region 336A corresponds to a storage region of a cartridge memory of the LTO standard before LTO8 (hereinafter, referred to as "existing cartridge memory".), and is a region for storing information conforming to the LTO standard before LTO8. The information conforming to the LTO standard before LTO8 includes, for example, production information (e.g., a unique number of the cartridge 10A), a use history (e.g., the number of times of tape drawing (Thread Count)), and the like.

The second storage region 336B corresponds to an extended storage region for the storage region of the existing cartridge memory. The second storage region 336B is a region for storing additional information. Here, the additional information means information relating to the cartridge 10A, which is not specified in the LTO standard before LTO8. Examples of the additional information include, but not limited to, tension adjustment information, management ledger data, Index information, and thumbnail information of a moving image stored in the magnetic tape 10. The tensioning adjustment information includes a distance between adjacent servo bands at the time of recording data on the magnetic tape 10 (distance between servo patterns recorded on adjacent servo bands). The distance between adjacent servo bands is an example of the width-related information relating to the width of the magnetic tape 10. The details of the distance between servo bands will be described below. In the following description, the information stored in the first storage region 336A is referred to as "first information", and the information stored in the second storage region 336B is referred to as "second information" in some cases.

The memory 336 may include a plurality of banks. In this case, the first storage region 336A may be configured by some of the plurality of banks, and the second storage region 336B may be configured by the remaining banks. Specifically, for example, in the case where the cartridge 10A conforms to LTO format standards for next and future generations, the memory 336 may include two banks having storage capacities of approximately 16 KB, one bank of the two banks may constitute the first storage region 336A, and the other bank may constitute the second storage region 336B.

The antenna coil 331 induces an induced voltage by electromagnetic induction. The controller 335 communicates with the recording/reproduction apparatus 30 in accordance with a defined communication standard via the antenna coil 331. Specifically, for example, mutual authentication, transmission and reception of commands, exchanging data, and the like are performed.

The controller 335 stores information received from the recording/reproduction apparatus 30 via the antenna coil 331 in the memory 336. The controller 335 reads information from the memory 336 and transmits it to the recording/reproduction apparatus 30 via the antenna coil 331 in response to a request from the recording/reproduction apparatus 30.

(7) Modified Example of Cartridge

[Configuration of Cartridge]

In the above-described embodiment, the case where the magnetic tape cartridge is a one-reel cartridge has been described, but the magnetic tape cartridge may be a two-reel cartridge. That is, the cartridge of the present technology may include one or more reels (e.g., two) on which the magnetic tape is wound. An example of a magnetic recording cartridge of the present technology including two reels will be described below with reference to FIG. 13.

Figure 13:
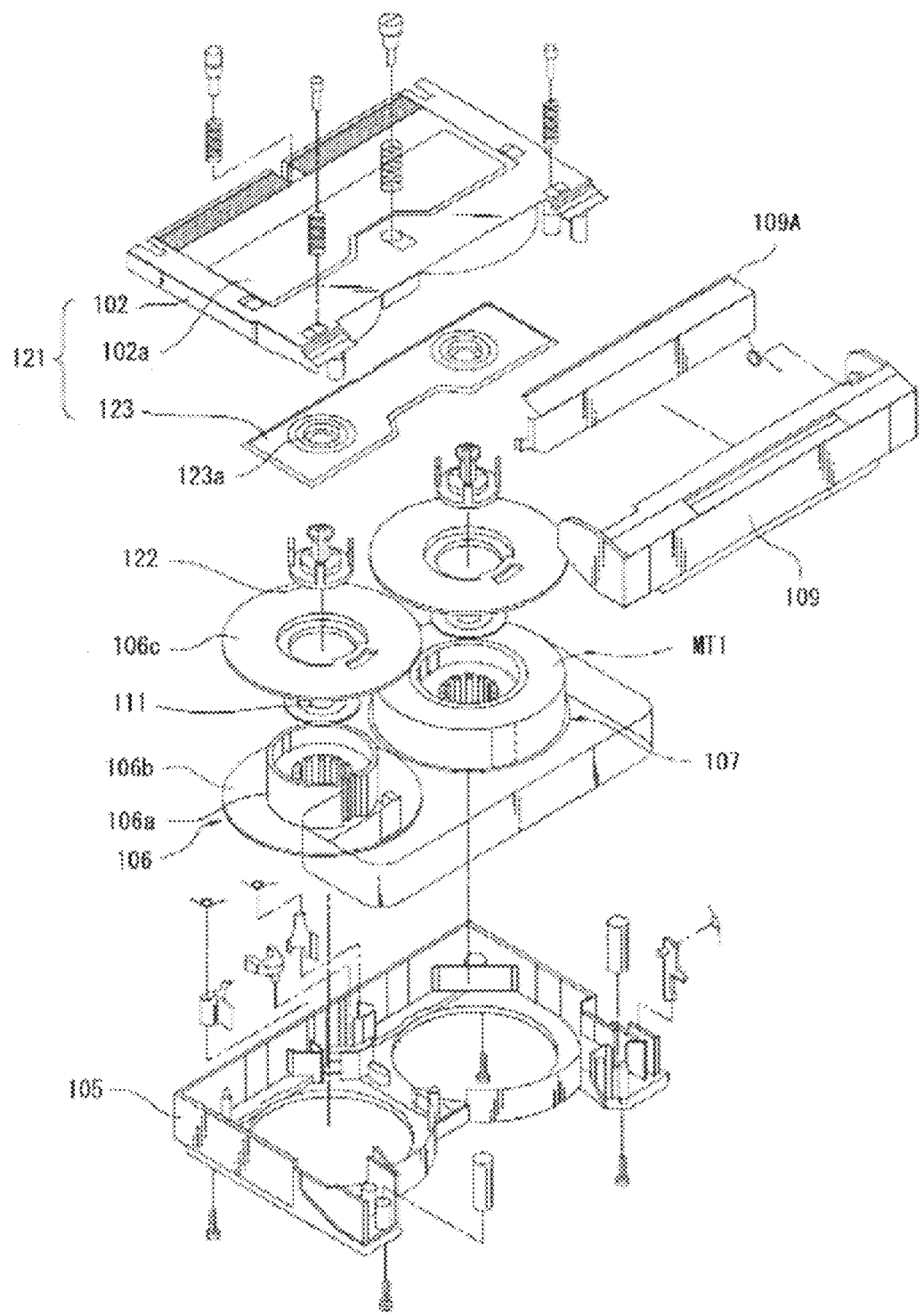
FIG. 13 is an exploded perspective view showing an example of a configuration of a cartridge according to a modified example.

FIG. 13 is an exploded perspective view showing an example of a configuration of a two-reel cartridge 121. The cartridge 121 includes an upper half 102 made of synthetic resin, a transparent window member 123 fitted and fixed to a window 102a opened in the upper surface of the upper half 102, a reel holder 122 fixed inside the upper half 102 and preventing reels 106 and 107 from floating up, a lower half 105 corresponding to the upper half 102, the reels 106 and 107 housed in a space formed when the upper half 102 and the lower half 105 are combined, a magnetic tape MT1 wound around the reels 106 and 107, a front lid 109 closing a front opening formed when the upper half 102 and the lower half 105 are combined, and a back lid 109A protecting the magnetic tape MT1 exposed in the front opening.

The reel 106 includes a lower flange 106b having a cylindrical hub portion 106a at the central portion, the magnetic tape MT1 being wound around the cylindrical hub portion 106a, an upper flange 106c having substantially the same size as the lower flange 106b, and a reel plate 111 sandwiched between the hub portion 106a and the upper flange 106c. The reel 107 has a configuration similar to that of the reel 106.

The window member 123 includes, at positions corresponding to the reels 106 and 107, respective mounting holes 123a for assembling the reel holder 122, which is a reel holding means for preventing the floating of these reels. The magnetic tape MT1 is similar to the magnetic tape T in the first embodiment.

(8) Effects

The magnetic recording medium 10 according to the present technology includes the magnetic layer 13, the underlayer 12, the base layer 11, and the back layer 14, in which the average thickness $t_T$ of the magnetic recording medium 10 is 5.3 μm or less; when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which the length in the longitudinal direction is shorter than the length at 40° C.; and the Poisson's ratio is 0.40 or less. As a result, the magnetic recording medium 10 can be reproduced or recorded satisfactorily even after long-term storage even if the total thickness is as thin as 5.3 μm or less.

(9) Modified Examples

Modified Example 1

Figure 8:
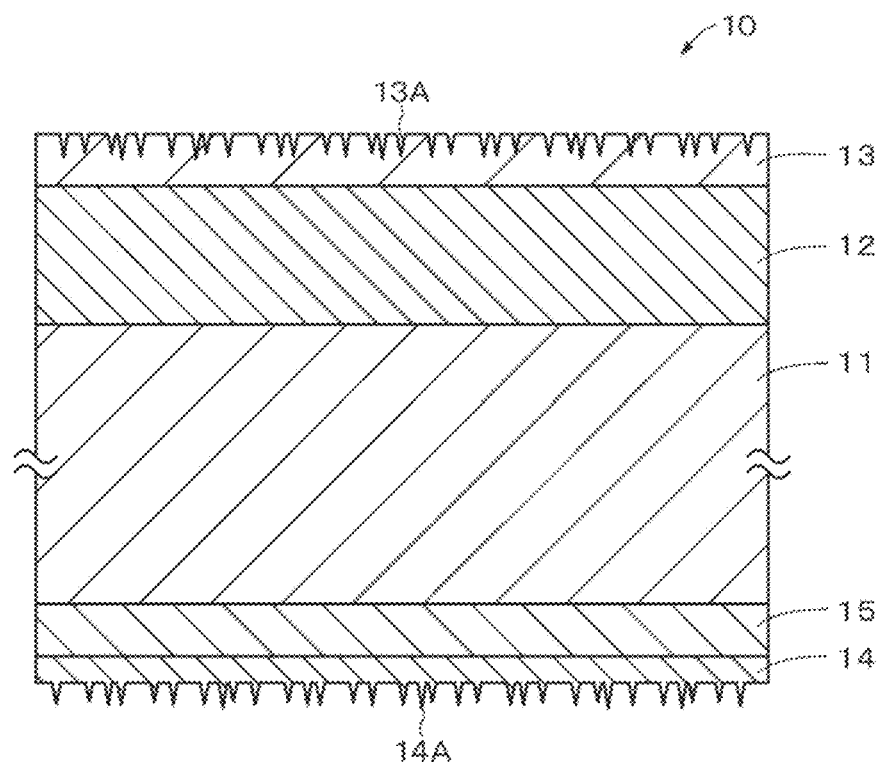
FIG. 8 is a schematic diagram showing a cross section of a magnetic recording medium according to a modified example.

As shown in FIG. 8, the magnetic recording medium 10 may further include a barrier layer 15 provided on at least one surface of the base layer 11. The barrier layer 15 is a layer for suppressing a dimensional change according to the environments of the base layer 11. For example, as an example of a reason for causing the dimensional change, there is a hygroscopicity of the base layer 11, and it is possible to reduce the speed of intrusion of moisture into the base layer 11 by the barrier layer 15. The barrier layer 15 includes a metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta can be used. As the metal oxide, for example, at least one of $Al_2O_3$, CuO, CoO, $SiO_2$, $Cr_2O_3$, $TiO_2$, $Ta_2O_5$, or $ZrO_2$ can be used, or any of the metal oxides can be used. Further, diamond-like carbon (DLC), diamond, or the like can also be used.

The average thickness of the barrier layer 15 is favorably 20 nm or more and 1,000 nm or less, and more favorably 50 nm or more and 1,000 nm or less. The average thickness of the barrier layer 15 is obtained in the same manner as in the average thickness $t_m$ of the magnetic layer 13. However, the magnification of the TEM image is appropriately adjusted in accordance with the thickness of the barrier layer 15.

Modified Example 2

The magnetic recording medium 10 may be incorporated into a library device. That is, the present technology also provides a library device including at least one magnetic recording medium 10. The library device has a configuration capable of adjusting the tension applied to the longitudinal direction of the magnetic recording medium 10, and may include a plurality of the recording/reproduction apparatuses 30 described above.

3. Examples

Hereinafter, the present technology will be specifically described by way of Examples, but the present technology is not limited to only these Examples.

In the following examples and comparative examples, the switching temperature, the contraction start temperature, the recording track width, the reproduction track width, the average thickness $t_T$, the average thickness of the base layer, the Poisson's ratio, the contraction ratio in the longitudinal direction, the contraction ratio in the width direction, and the SNR are values obtained by the measurement method described in "2. Embodiment of present technology (example of coating-type magnetic recording medium)".

(1) Production of Magnetic Tape

Magnetic tapes of Examples 1 to 13 and Comparative examples 1 to 2 were prepared as described below. The production conditions are shown in Table 1 below. Further, Table 2 below shows the switching temperature, the contraction start temperature, the recording track width, the reproduction track width, the average thickness $t_T$, the average thickness of the base layer, the Poisson's ratio, the contraction ratio in the longitudinal direction, and the contraction ratio in the width direction of these magnetic tapes.

Example 1

(Step of Preparing Coating Material for Forming Magnetic Layer) A coating material for forming a magnetic layer was prepared as follows. First, a first composition and a second composition of the following formulation were prepared by dispersion treatment, respectively.

(First Composition)

Powder of barium ferrite ($BaFe_{12}O_{19}$) particles (hexagonal plate-like, average aspect-ratio 2.8, average particle volume 1950 $nm^3$): 100 parts by mass Cyclohexanone solution of vinyl chloride resin: 60 parts by mass (The composition of the solution is 30% by mass of resin and 70% by mass of cyclohexanone. Details of the vinyl chloride resin were as follows: the degree of polymerization 300, Mn=10,000, containing $OSO_3K$=0.07 mmol/g and secondary OH=0.3 mmol/g as polar groups.)

Aluminum oxide powder: 5 parts by mass ($\alpha$-$Al_2O_3$, average particle size 0.2 μm)

(Second Composition)

Carbon black: 2 parts by mass (Manufactured by Tokai Carbon Co., Ltd., trade name: Seast TA)

Cyclohexanone solution of vinyl chloride resin: 3.7 parts by mass (The composition of the solution is 30% by mass of resin and 70% by mass of cyclohexanone.)

N-butyl stearate: 2 parts by mass

Methyl ethyl ketone: 121.3 parts by mass

Toluene: 121.3 parts by mass

Cyclohexanone: 60.7 parts by mass

Next, the prepared first composition and second composition were mixed and stirred. As curing agents, polyisocyanate (trade name: coronate L, manufactured by Tosoh Corporation): 4 parts by mass and stearic acid: 2 parts by mass were added to the obtained mixture.

(Step of Preparing Coating Material for Forming Underlayer)

A coating material for forming an underlayer was prepared as follows. First, a third composition of the following formulation was prepared by dispersion treatment.

(Third Composition)

Acicular iron oxide powder: 100 parts by mass ($\alpha$-$Fe_2O_3$, average major axis length 0.10 μm)

Carbon black: 20 parts by mass (Average particle size 20 nm)

Cyclohexanone solution of vinyl chloride resin: 30 parts by mass (The composition of the solution is 30% by mass of resin and 70% by mass of cyclohexanone.)

Polyurethane resin: 5 parts by mass (The glass transition temperature Tg of the polyurethane resin is 75° C.)

N-butyl stearate: 2 parts by mass

Methyl ethyl ketone: 198.2 parts by mass

Toluene: 198.2 parts by mass

Cyclohexanone: 68.6 parts by mass

A curing agent (trade name: coronate L, manufactured by Tosoh Corporation): 4 parts by mass and myristic acid: 2 parts by mass were added to the obtained third composition.

(Process of Preparing Coating Material for Forming Back Layer)

A coating material for forming a back layer was prepared as follows. A coating material for forming a back layer was prepared by mixing the following raw materials in a stirring tank including a dispersion device and performing filter treatment thereon.

Carbon black powder of small particle size (average particle size (D50) 20 nm): 90 parts by mass Carbon black powder of large particle size (average particle size (D50) 270 nm): 10 parts by mass Polyester polyurethane: 100 parts by mass (manufactured by Tosoh Corporation, trade name: N-2304)

Methyl ethyl ketone: 500 parts by mass

Toluene: 400 parts by mass

Cyclohexanone: 100 parts by mass (Laminate Forming Step)

Using the coating material for forming a magnetic layer and the coating material for forming an underlayer prepared as described above, an underlayer was formed on one main surface of an elongated polyethylene terephthalate film (hereinafter referred to as "PET film") having an average thickness of 4.0 μm, which is a non-magnetic support, in the following manner such that the average thickness after drying and calendering was 0.9 μm, and a magnetic layer was formed in the following manner such that the average thickness after drying and calendering was 80 nm. First, a coating material for forming an underlayer was applied on one main surface of a PET film and dried to form an underlayer. Next, a coating material for forming a magnetic layer was applied on the underlayer and dried to form a magnetic layer. Note that when the coating material for forming a magnetic layer was dried, the magnetic field of the magnetic powder is oriented in the thickness direction of the film, i.e., perpendicularly oriented by a solenoid coil. The degree of perpendicular orientation was 66%. Subsequently, a coating material for forming a back layer was applied on the other main surface of the PET film and dried to form a back layer having an average thickness of 0.4 μm. Thus, a laminate was obtained.

(Calendering Step, Transfer Step)

Subsequently, calendering treatment was performed to smooth the surface of the magnetic layer. Next, the obtained laminate was wound into a roll shape, and then heating treatment was performed on the laminate in this state at 60° C. for 10 hours. Then, after the laminate was rewound into a roll shape such that the end portion located on the inner peripheral side is located on the outer peripheral side conversely, heating treatment was performed again on the laminate in this state at 60° C. for 10 hours. As a result, a large number of protrusions on the surface of the back layer were transferred to the surface of the magnetic layer, and a large number of pores were formed on the surface of the magnetic layer.

(Thermal History Relaxation Treatment Step)

In addition, the laminate was stored at 70° C. for 24 hours. As a result, the strain of the laminate was alleviated, and the switching temperature and the contraction start temperature were adjusted.

(Cutting Process)

The laminate obtained as described above was cut into a ½ inch (12.65 mm) width. As a result, a desired elongated magnetic tape (having an average thickness of 5.4 μm) was obtained.

(Measurement by Thermomechanical Analyzer)

Measurement was performed on the magnetic tape by a thermomechanical analyzer as described in "2. Embodiment of present technology (example of coating-type magnetic recording medium)".

As a result of the measurement, the switching temperature for switching from thermal expansion to thermal contraction was 80° C. Further, the contraction start temperature at which the length in the longitudinal direction is shorter than the length at 40° C. was 100° C.

Example 2

A magnetic tape was produced in the same manner as in Example 1 except that the non-magnetic support was changed from the PET film to a polyethylene naphthalate film (hereinafter, referred to as "PEN film").

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 100° C.

Example 3

A magnetic tape was produced in the same manner as in Example 2 except that the laminate obtained after the transfer step was subjected to a low tension heat treatment step of causing the laminate to travel for 120 seconds under the condition of 110° C. while a tension of 0.1 N or less per ½ inch length in the width direction was applied to the laminate in the longitudinal direction.

The magnetic tape was measured by a thermomechanical analyzer in the same manner as in Example 1. As a result of the measurement, the switching temperature for switching from thermal expansion to thermal contraction was 100° C. Further, the contraction start temperature at which the length in the longitudinal direction is shorter than the length at 40° C. was 110° C.

Example 4

A magnetic tape was produced in the same manner as in Example 3 except that the temperature in the thermal history relaxation treatment step was set to 60° C. and the treatment time was set to 72 hours.

The magnetic tape was measured by a thermomechanical analyzer in the same manner as in Example 1. As a result of the measurement, the switching temperature for switching from thermal expansion to thermal contraction was 110° C. Further, the contraction start temperature at which the length in the longitudinal direction is shorter than the length at 40° C. was 120° C.

Example 5

A magnetic tape was produced in the same manner as in Example 2 except that the temperature in the thermal history relaxation treatment step was set to 75° C. and the treatment time was set to 48 hours.

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 110° C.

Example 6

A magnetic tape was produced in the same manner as in Example 2 except that the temperature in the thermal history relaxation treatment step was set to 60° C. and the treatment time was set to 72 hours.

The magnetic tape was measured by a thermomechanical analyzer in the same manner as in Example 1. A graph based on the measurement results is shown in FIG. 12. As a result of the measurement, the switching temperature for switching from thermal expansion to thermal contraction was 90° C. Further, the contraction start temperature at which the length in the longitudinal direction is shorter than the length at 40° C. was 120° C.

Example 7

A magnetic tape was produced in the same manner as in Example 2.

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 100° C.

Example 8

A magnetic tape was produced in the same manner as in Example 3.

The magnetic tape was measured by a thermomechanical analyzer in the same manner as in Example 1. As a result of the measurement, the switching temperature for switching from thermal expansion to thermal contraction was 100° C. Further, the contraction start temperature at which the length in the longitudinal direction is shorter than the length at 40° C. was 110° C.

Example 9

A magnetic tape was produced in the same manner as in Example 3.

The magnetic tape was measured by a thermomechanical analyzer in the same manner as in Example 1. As a result of the measurement, the switching temperature for switching from thermal expansion to thermal contraction was 100° C. Further, the contraction start temperature at which the length in the longitudinal direction is shorter than the length at 40° C. was 110° C.

Example 10

A magnetic tape was produced in the same manner as in Example 2 except that the magnetic powder contained in the magnetic layer was changed from a powder of barium ferrite particles to a powder of strontium ferrite particles.

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 100° C.

Example 11

A magnetic tape was produced in the same manner as in Example 2 except that the magnetic powder contained in the magnetic layer was changed from a powder of barium ferrite particles to a powder of ε-iron oxide nanoparticles.

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 100° C.

Example 12

A magnetic tape was obtained in the same manner as in Example 2 except that the magnetic powder contained in the magnetic layer was changed from a powder of barium ferrite particles to a powder of cobalt ferrite particles.

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 100° C.

Example 13

A magnetic tape was produced in the same manner as in Example 2.

The magnetic tape was measured by a thermomechanical analyzer in the same manner as in Example 1. As a result of the measurement, the switching temperature for switching from thermal expansion to thermal contraction was 90° C. Further, the contraction start temperature at which the length in the longitudinal direction is shorter than the length at 40° C. was 100° C.

Comparative Example 1

A magnetic tape was obtained in the same manner as in Example 1 except that the non-magnetic support was changed from a PET film to an ARAMID film.

The magnetic tape was measured by a thermomechanical analyzer in the same manner as in Example 1. The graph obtained by this measurement is shown in FIG. 12. As a result of the measurement, the switching temperature for switching from thermal expansion to thermal contraction, and the contraction start temperature at which the length in the longitudinal direction is shorter than the length at 40° C. were not detected.

Comparative Example 2

A magnetic tape was obtained in the same manner as in Example 2 except that the thermal history relaxation treatment step was not performed.

The magnetic tape was measured by a thermomechanical analyzer in the same manner as in Example 1. As a result of the measurement, the switching temperature for switching from thermal expansion to thermal contraction was 55° C. Further, the contraction start temperature at which the length in the longitudinal direction is shorter than the length at 40° C. was 70° C.

(2) Evaluation (Evaluation of Contraction Ratio in Longitudinal Direction and Contraction Ratio in Width Direction)

For the magnetic tapes of Examples 1 to 13 and Comparative examples 1 to 2 produced in (1) above, the contraction ratio in the longitudinal direction and the contraction ratio in the width direction were measured. The contraction ratio in the longitudinal direction and the contraction ratio in the width direction were measured by the measurement method described in "2. Embodiment of present technology (example of coating-type magnetic recording medium)". The measurement results are shown in Table 2 below.

(Evaluation of Influences on Reproduction Due to Long-Term Storage)

Each of the magnetic tapes of Examples 1 to 13 and Comparative examples 1 to 2 was wound around a reel provided in a cartridge case to obtain a magnetic recording cartridge. Servo signals were recorded on the entire length of the magnetic tape, and information was recorded. The servo signal was made of a row of magnetic patterns having the inverted V shape. The recording track width of each magnetic recording cartridge is shown in Table 2.

Next, each of the magnetic recording cartridges of Examples 1 to 13 and Comparative examples 1 to 2 was reproduced in full length by a magnetic recording/reproduction apparatus. The reproduction track width of the reproduction head used in the full-length reproduction of each magnetic recording cartridge is shown in Table 2. Further, the ratio of (reproduction track width/recording track width) of each magnetic recording cartridge is also shown in the same table.

After that, each magnetic recording cartridge was stored at 35° C. in the environment of 60% for 20 days. After the storage, each magnetic recording cartridge was reproduced in full length in the same manner as described above.

On the basis of the difference in time required for full-length reproduction before and after the storage, the magnetic tape of each magnetic recording cartridge was evaluated according to the following criteria. The evaluation results are shown in Table 2.

<Evaluation Criteria>

1: Although a retry does not occur in full-length reproduction or occurs in full-length reproduction, the time required for full-length reproduction after storage is less than 1.02 times the time required for full-length reproduction before storage.

2: A retry occurs in full-length reproduction, whereby the time required for full-length reproduction after storage is 1.02 times or more and less than 1.1 times the time required for full-length reproduction before storage.

3: A retry occurs in full-length reproduction, whereby the time required for full-length reproduction after storage is 1.1 times or more and less than 1.2 times the time required for full-length reproduction before storage.

4: Retries occur frequently in full-length reproduction, whereby the time required for full-length reproduction after storage is 1.2 times or more the time required for full-length reproduction before storage.

5: A fail (reproduction stop due to error) occurs in full-length reproduction, and full-length reproduction cannot be performed.

(Evaluation of SNR)

In addition, the SNRS of the magnetic tapes of Examples 1 to 13 and Comparative examples 1 to 2 were evaluated. The evaluation results are shown in Table 2 below. The SNR was evaluated by the following method.

First, using a ½-inch tape traveling device (MTS Transport manufactured by Mountain Engineering II) to which a recording/reproduction head and a recording/reproduction amplifier are attached, the SNR (electromagnetic conversion characteristics) of the magnetic tape in a 25° C. environment was measured. A ring head having a gap length of 0.2 μm was used as a recording head, and a GMR head having a distance between shields of 0.1 μm was used as a reproduction head. The relative velocity was set to 6 m/s, the recording clock frequency was set to 160 MHz, and the recording track width was set to 2.0 μm. Further, the SNR was calculated on the basis of the method described in the following literature. A relative evaluation for the SNR on whether the SNR increased or decreased with reference to the value of Example 1 was performed.

Y. Okazaki: "An Error Rate Emulation System.", IEEE Trans. Man., 31, pp. 3093-3095(1995)

TABLE 1

|  | Low tension heat treatment | Thermal history relaxation treatment temperature [° C.] | Thermal history relaxation treatment time [h] |
| --- | --- | --- | --- |
| Example 1 | Not applied | 70 | 24 |
| Example 2 | Not applied | 70 | 24 |
| Example 3 | Applied | 70 | 24 |
| Example 4 | Applied | 60 | 72 |
| Example 5 | Not applied | 75 | 48 |
| Example 6 | Not applied | 60 | 72 |
| Example 7 | Not applied | 70 | 24 |
| Example 8 | Applied | 70 | 24 |
| Example 9 | Applied | 70 | 24 |
| Example 10 | Not applied | 70 | 24 |
| Example 11 | Not applied | 70 | 24 |
| Example 12 | Not applied | 70 | 24 |
| Example 13 | Not applied | 70 | 24 |
| Comparative example 1 | Not applied | 70 | 24 |

TABLE 1-continued

| | Low tension heat treatment | Thermal history relaxation treatment temperature [° C.] | Thermal history relaxation treatment time [h] |
|---|---|---|---|
| Comparative example 2 | Not applied | Absent | Absent |

TABLE 2

| | Switching temperature [° C.] | Contraction start temperature [° C.] | Recording track width [μm] | Reproduction track width [μm] | Reproduction track width/ Recording track width | Perpendicular orientation | Average thickness $t_T$ of magnetic recording medium [μm] |
|---|---|---|---|---|---|---|---|
| Example 1 | 80 | 100 | 1.56 | 1.01 | 0.65 | Yes | 5.4 |
| Example 2 | 90 | 100 | 1.56 | 1.01 | 0.65 | Yes | 5.4 |
| Example 3 | 100 | 110 | 1.56 | 1.01 | 0.65 | Yes | 5.4 |
| Example 4 | 110 | 120 | 1.56 | 1.01 | 0.65 | Yes | 5.4 |
| Example 5 | 90 | 110 | 1.56 | 1.01 | 0.65 | Yes | 5.4 |
| Example 6 | 90 | 120 | 1.56 | 1.01 | 0.65 | Yes | 5.4 |
| Example 7 | 90 | 100 | 1.56 | 1.09 | 0.70 | Yes | 5.4 |
| Example 8 | 100 | 110 | 0.87 | 0.67 | 0.77 | Yes | 5.4 |
| Example 9 | 100 | 110 | 1.17 | 0.97 | 0.83 | Yes | 5.4 |
| Example 10 | 90 | 100 | 1.56 | 1.01 | 0.65 | Yes | 5.4 |
| Example 11 | 90 | 100 | 1.56 | 1.01 | 0.65 | Yes | 5.4 |
| Example 12 | 90 | 100 | 1.56 | 1.01 | 0.65 | Yes | 5.4 |
| Example 13 | 90 | 100 | 1.17 | 0.64 | 0.55 | Yes | 5.4 |
| Comparative example 1 | Absent | Absent | 1.56 | 1.01 | 0.65 | Yes | 5.4 |
| Comparative | 55 | 70 | 1.56 | 1.01 | 0.65 | Yes | 5.4 |

| | Base layer | | | Type of magnetic powder | Contraction ratio in longitudinal direction [%] | Contraction ratio in width direction [%] | Full-length reproduction evaluation | SNR [dB] |
|---|---|---|---|---|---|---|---|---|
| | Average thickness of base layer [μm] | Main component | Poisson's ratio | | | | | |
| Example 1 | 4.0 | PET | 0.26 | $BaFe_{12}O_{19}$ | 0.08 | −0.025 | 1 | 0.0 |
| Example 2 | 4.0 | PEN | 0.34 | $BaFe_{12}O_{19}$ | 0.07 | −0.023 | 2 | 0.0 |
| Example 3 | 4.0 | PEN | 0.35 | $BaFe_{12}O_{19}$ | 0.05 | −0.015 | 1 | 0.0 |
| Example 4 | 4.0 | PEN | 0.36 | $BaFe_{12}O_{19}$ | 0.04 | −0.012 | 1 | 0.0 |
| Example 5 | 4.0 | PEN | 0.34 | $BaFe_{12}O_{19}$ | 0.08 | −0.026 | 1 | 0.0 |
| Example 6 | 4.0 | PEN | 0.34 | $BaFe_{12}O_{19}$ | 0.08 | −0.026 | 1 | 0.0 |
| Example 7 | 4.0 | PEN | 0.34 | $BaFe_{12}O_{19}$ | 0.08 | −0.025 | 3 | 0.3 |
| Example 8 | 4.0 | PEN | 0.35 | $BaFe_{12}O_{19}$ | 0.08 | −0.025 | 3 | −1.5 |
| Example 9 | 4.0 | PEN | 0.35 | $BaFe_{12}O_{19}$ | 0.08 | −0.025 | 3 | −0.1 |
| Example 10 | 4.0 | PEN | 0.34 | $SrFe_{12}O_{19}$ | 0.08 | −0.024 | 2 | 0.1 |
| Example 11 | 4.0 | PEN | 0.34 | ε-iron oxide | 0.08 | −0.024 | 2 | −0.1 |
| Example 12 | 4.0 | PEN | 0.34 | Cobalt ferrite | 0.08 | −0.024 | 2 | 0.2 |
| Example 13 | 4.0 | PEN | 0.34 | $BaFe_{12}O_{19}$ | 0.08 | −0.024 | 2 | −2.0 |
| Comparative example 1 | 4.0 | ARAMID | 0.39 | $BaFe_{12}O_{19}$ | 0.12 | −0.040 | 4 | 0.0 |
| Comparative | 4.0 | PEN | 0.33 | $BaFe_{12}O_{19}$ | 0.13 | −0.049 | 5 | 0.0 |

From the results of Table 2, the following can be seen.

In all of the magnetic tapes of Examples 1 to 13, the evaluation results of the influence on reproduction due to long-term storage were 1 to 3. In other words, the magnetic tapes of Examples 1 to 13 could be reproduced in full length, though the time required for full-length reproduction was somewhat increased due to long-term storage. On the other hand, the magnetic tape of Comparative example 1 had many retries, and the magnetic tape of Comparative example 2 could not reproduce the full length.

Further, comparing the results of Examples 1 to 13 with those of Comparative examples 1 and 2, it can be seen that the influence on reproduction due to long-term storage can be reduced when the switching temperature for switching from thermal expansion to thermal contraction is 80° C. or more and the contraction start temperature at which the length in the longitudinal direction is shorter than the length at 40° C. is 100° C. or more.

Then, comparing the results of Examples 1 to 13 with those of Comparative examples 1 and 2, it can be seen that the influence on reproduction due to long-term storage can be reduced when the Poisson's ratio is 0.40 or less, favorably 0.38 or less.

Then, comparing the results of Examples 1 to 13 with those of Comparative examples 1 and 2, it can be seen that the influence on reproduction due to long-term storage can be reduced when the contraction ratio in the width direction is 0.06% or less.

In addition, the magnetic tapes of Examples 10 to 12 differ in the type of the magnetic powder from Example 2, but the same degree of the contraction ratio, the full-length reproduction evaluation result, and the SNR as in Example 2 were obtained. Therefore, even if the type of the magnetic powder is changed, the effect of the present technology can be obtained.

Comparing Examples 2, 8, and 13, Example 2 had a better evaluation result of the SNR than in Examples 8 and 13. Therefore, it is considered that the recording/reproducing characteristics are improved by setting the ratio of (reproduction track width/recording track width) to, for example, 0.56 or more, favorably 0.60 or more.

Further, comparing Examples 3, 8, and 9, Example 3 had a better evaluation result of the full-length reproduction after long-term storage than in Examples 8 and 9. Therefore, it is considered that the influence on reproduction due to long-term storage can be reduced by setting the ratio of (reproduction track width/recording track width) to, for example, 0.80 or less, favorably 0.75 or less, and more favorably 0.70 or less.

Further, from comparison of the results of Examples 1 to 13 and Comparative examples 1 and 2, it is considered favorable that the contraction ratio in the longitudinal direction is, for example, 0.10% or less, favorably 0.08% or less, in order to achieve the effect of the present technology. Further, it is also considered favorable that the contraction ratio in the width direction is, for example, 0.06% or less, favorably 0.05% or less, in order to achieve the effect of the present technology.

While embodiments of the present technology and Examples have been specifically described above, the present technology is not limited to the above-described embodiments and Examples, and various modifications based on the technical idea of the present technology can be made.

For example, the configurations, methods, processes, shapes, materials, numerical values, and the like described in the above-mentioned embodiments and Examples are merely examples, and other configurations, methods, processes, shapes, materials, numerical values, and the like may be used as necessary. In addition, the chemical formulae of compounds and the like are representative ones, and the valences and the like are not limited as long as they represent common names of the same compound.

The above-mentioned configurations, methods, processes, shapes, materials, numerical values, and the like in the embodiments and Examples can be combined with each other without departing from the essence of the present technology.

Further, in this specification, the numerical range indicated by using "to" indicates a range including numerical values described before and after "to" as a minimum value and a maximum value, respectively. In the numerical range described in the present specification in a stepwise manner, the upper limit value or the lower limit value of the numerical range at one step may be replaced by the upper limit value or the lower limit value of the numerical range at another step. Unless otherwise specified, one of the materials exemplified in this specification can be used alone, or two or more of them can be used in combination.

Note that the present technology may also take the following configurations.

(1) A tape-shaped magnetic recording medium, including:
   a magnetic layer;
   an underlayer;
   a base layer; and
   a back layer, in which
   the magnetic recording medium has an average thickness $t_T$ of 5.4 μm or less,
   when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which a length in a longitudinal direction is shorter than the length at 40° C., and a Poisson's ratio is 0.40 or less.

(2) The magnetic recording medium according to (1), in which
   the average thickness $t_T$ of the magnetic recording medium is 5.3 μm or less.
(3) The magnetic recording medium according to (1) or (2), in which
   the Poisson's ratio is 0.38 or less.
(4) The magnetic recording medium according to any one of (1) to (3), in which
   the base layer contains any of PET and PEN.
(5) The magnetic recording medium according to any one of (1) to (4), in which
   the base layer has a thickness of 4.2 μm or less.
(6) The magnetic recording medium according to any one of (1) to (5), in which
   the base layer has a thickness of 4.0 μm or less.
(7) The magnetic recording medium according to any one of (1) to (6), in which
   the magnetic recording medium has a squareness ratio of 65% or more in a perpendicular direction.
(8) The magnetic recording medium according to any one of (1) to (7), in which
   the magnetic recording medium has a contraction ratio of −0.035% or more in a width direction.
(9) The magnetic recording medium according to any one of (1) to (8), in which
   the magnetic layer has an average thickness $t_m$ of 80 nm or less.
(10) The magnetic recording medium according to any one of (1) to (9), in which
   the magnetic layer has an average thickness $t_m$ of 50 nm or less.
(11) The magnetic recording medium according to any one of (1) to (10), in which
   the magnetic layer contains a magnetic powder, and
   the magnetic powder contains hexagonal ferrite, ε-iron oxide, or Co-containing spinel ferrite.
(12) The magnetic recording medium according to (11), in which
   the hexagonal ferrite contains at least one of Ba or Sr, and
   the ε-iron oxide contains at least one of Al or Ga.
(13) The magnetic recording medium according to any one of (1) to (12), in which
   the magnetic recording medium has a coercive force Hc of 2,000 Oe or less in the longitudinal direction.
(14) The magnetic recording medium according to any one of (1) to (13), in which
   the magnetic layer is configured to be capable of recording data such that a minimum value of a magnetization reversal distance L is 48 nm or less.
(15) The magnetic recording medium according to any one of (1) to (14), in which
   the magnetic layer contains a magnetic powder, and
   the magnetic powder has an average aspect ratio of 1.0 or more and 3.5 or less.
(16) The magnetic recording medium according to any one of (1) to (15), in which
   the magnetic layer contains a magnetic powder, and
   the magnetic powder has an average particle size of 50 nm or less.
(17) The magnetic recording medium according to any one of (1) to (16), in which
   the magnetic layer contains a magnetic powder, and
   the magnetic powder has an average particle volume of 1,500 $nm^3$ or less.

(18) The magnetic recording medium according to any one of (1) to (15), in which
the magnetic layer contains a magnetic powder, and
the magnetic powder has an average particle volume of 1,300 nm³ or less.
(19) A tape cartridge, including
the magnetic recording medium according to any one of (1) to (18).
(20) The tape cartridge according to (19), further including:
a communication unit that communicates with a recording/reproduction apparatus;
a storage unit; and
a control unit that stores, in the storage unit, information received from the recording/reproduction apparatus via the communication unit, and reads the information from the storage unit and transmits the read information to the recording/reproduction apparatus via the communication unit in response to a request from the recording/reproduction apparatus, the information including adjustment information for adjusting tension applied to the magnetic recording medium in a longitudinal direction.
(21) A method of producing a tape-shaped magnetic recording medium, including:
a laminate forming step of forming a laminate by forming an underlayer and a magnetic layer on one surface of a base layer and forming a back layer on another surface of the base layer; and
a thermal history relaxation treatment step of storing the laminate obtained in the laminate forming step for 10 hours or more and 100 hours or less under a condition of 50° C. or more and 80° C. or less, in which
the magnetic recording medium is produced through the thermal history relaxation treatment step,
the magnetic recording medium has an average thickness $t_T$ of 5.4 μm or less,
when a thermomechanical analysis is performed on the magnetic recording medium in a temperature range of 40° C. to 150° C. at a temperature rise rate of 1° C./minute, a switching temperature for switching from thermal expansion to thermal contraction is 70° C. or more, and a contraction start temperature is 90° C. or more at which a length in a longitudinal direction is shorter than the length at 40° C., and
a Poisson's ratio is 0.40 or less.
(22) The method of producing a tape-shaped magnetic recording medium according to (21), in which
the thermal history relaxation treatment step includes a low tension heat treatment step of causing the laminate to travel for 15 seconds or more and 240 seconds or less under a condition of 80° C. or more and 150° C. or less while a tension of 0.1 N or less per ½ inch length in a width direction is applied to the laminate in the longitudinal direction.

REFERENCE SIGNS LIST 10 magnetic recording medium
11 base layer
12 underlayer
13 magnetic layer
14 back layer

The invention claimed is:

1. A tape shaped magnetic recording medium, comprising:
a magnetic layer;
an underlayer;
a base layer; and
a back layer, wherein
the magnetic recording medium has an average thickness $t_T$ of 5.4 μm or less, a switching temperature for switching from thermal expansion to thermal contraction is 70° C. or more, and a contraction start temperature is 90° C. or more at which a length in a longitudinal direction is shorter than the length at 40° C. based on a thermomechanical analysis performed on the magnetic recording medium in a temperature range of 40° C. to 150° C. at a temperature rise rate of 1° C./minute,
a Poisson's ratio is 0.40 or less, and
wherein the magnetic recording medium is a tape-shaped magnetic recording medium.

2. The magnetic recording medium according to claim 1, wherein the average thickness $t_T$ of the magnetic recording medium is 5.3 μm or less.

3. The magnetic recording medium according to claim 1, wherein the Poisson's ratio is 0.38 or less.

4. The magnetic recording medium according to claim 1, wherein the base layer contains polyester as a main component.

5. The magnetic recording medium according to claim 1, wherein the base layer has a thickness of 4.2 μm or less.

6. The magnetic recording medium according to claim 1, wherein the base layer has a thickness of 4.0 μm or less.

7. The magnetic recording medium according to claim 1, wherein the magnetic recording medium has a squareness ratio of 65% or more in a perpendicular direction.

8. The magnetic recording medium according to claim 1, wherein the magnetic recording medium has a contraction ratio of −0.035% or more in a width direction.

9. The magnetic recording medium according to claim 1, wherein the magnetic layer has an average thickness $t_m$ of 80 nm or less.

10. The magnetic recording medium according to claim 1, wherein the magnetic layer has an average thickness $t_m$ of 50 nm or less.

11. The magnetic recording medium according to claim 1, wherein
the magnetic layer contains a magnetic powder, and
the magnetic powder contains hexagonal ferrite, ε-iron oxide, or Co-containing spinel ferrite.

12. The magnetic recording medium according to claim 11, wherein
the hexagonal ferrite contains at least one of Ba or Sr, and
the ε-iron oxide contains at least one of Al or Ga.

13. The magnetic recording medium according to claim 1, wherein
the magnetic recording medium has a coercive force Hc of 2,000 Oe or less in the longitudinal direction.

14. The magnetic recording medium according to claim 1, wherein
the magnetic layer is configured to be capable of recording data such that a minimum value of a magnetization reversal distance L is 48 nm or less.

15. The magnetic recording medium according to claim 1, wherein
the magnetic layer contains a magnetic powder, and
the magnetic powder has an average aspect ratio of 1.0 or more and 3.5 or less.

16. The magnetic recording medium according to claim 1, wherein
the magnetic layer contains a magnetic powder, and
the magnetic powder has an average particle size of 50 nm or less.

17. The magnetic recording medium according to claim 1, wherein
the magnetic layer contains a magnetic powder, and
the magnetic powder has an average particle volume of 1,500 nm$^3$ or less.

18. The magnetic recording medium according to claim 1, wherein
the magnetic layer contains a magnetic powder, and
the magnetic powder has an average particle volume of 1,300 nm$^3$ or less.

19. A tape cartridge, comprising
the magnetic recording medium according to claim 1.

20. The tape cartridge according to claim 19, further comprising:
a communication unit that communicates with a recording/reproduction apparatus;
a storage unit; and
a control unit that stores, in the storage unit, information received from the recording/reproduction apparatus via the communication unit, and reads the information from the storage unit and transmits the read information to the recording/reproduction apparatus via the communication unit in response to a request from the recording/reproduction apparatus, the information including adjustment information for adjusting tension applied to the magnetic recording medium in a longitudinal direction.

21. A method of producing a magnetic recording medium, comprising:
a laminate forming step of forming a laminate by forming an underlayer and a magnetic layer on one surface of a base layer and forming a back layer on another surface of the base layer; and
a thermal history relaxation treatment step of storing the laminate obtained in the laminate forming step for 10 hours or more and 100 hours or less under a condition of 50° C. or more and 80° C. or less, wherein
the magnetic recording medium is produced through the thermal history relaxation treatment step,
the magnetic recording medium has an average thickness tT of 5.4 μm or less,
a switching temperature for switching from thermal expansion to thermal contraction is 70° C. or more, and a contraction start temperature is 90° C. or more at which a length in a longitudinal direction is shorter than the length at 40° C. based on a thermomechanical analysis performed on the magnetic recording medium in a temperature range of 40° C. to 150° C. at a temperature rise rate of 1° C./minute,
a Poisson's ratio is 0.40 or less, and
wherein the magnetic recording medium is a tape-shaped magnetic recording medium.

22. The method of producing a tape shaped magnetic recording medium according to claim 21, wherein
the thermal history relaxation treatment step includes a low tension heat treatment step of causing the laminate to travel for 15 seconds or more and 240 seconds or less under a condition of 80° C. or more and 150° C. or less while a tension of 0.1 N or less per ½ inch length in a width direction is applied to the laminate in the longitudinal direction.

* * * * *